(12) United States Patent
Yuan et al.

(10) Patent No.: US 10,698,550 B2
(45) Date of Patent: Jun. 30, 2020

(54) CAPACITANCE DETECTION CIRCUIT, TOUCH DETECTION DEVICE AND TERMINAL DEVICE

(71) Applicant: SHENZHEN WEITONGBO TECHNOLOGY CO., LTD., Shenzhen (CN)

(72) Inventors: Guangkai Yuan, Shenzhen (CN); Hong Jiang, Shenzhen (CN); Guopao Li, Shenzhen (CN)

(73) Assignee: SHENZHEN WEITONGBO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/438,459

(22) Filed: Jun. 11, 2019

(65) Prior Publication Data

US 2019/0302928 A1    Oct. 3, 2019

Related U.S. Application Data

(63) Continuation of application No. PCT/CN2018/081331, filed on Mar. 30, 2018.

(51) Int. Cl.
  *G06F 3/045* (2006.01)
  *G06F 3/044* (2006.01)
(52) U.S. Cl.
  CPC .................... *G06F 3/044* (2013.01)
(58) Field of Classification Search
  CPC .... G06F 3/04166; G06F 3/044; G06F 3/0445; G06F 3/0446
  See application file for complete search history.

(56) References Cited

U.S. PATENT DOCUMENTS

| 8,830,207 | B1 | 9/2014 | Joharapurkar et al. |
| 2009/0032312 | A1 | 2/2009 | Huang et al. |
| 2011/0261005 | A1 | 10/2011 | Ravindra et al. |
| 2013/0293294 | A1* | 11/2013 | Lyden .................... H03G 3/008 330/69 |
| 2016/0034094 | A1* | 2/2016 | Kang .................... G06F 3/0416 345/173 |
| 2018/0121699 | A1 | 5/2018 | Zhang et al. |

FOREIGN PATENT DOCUMENTS

| CN | 203084695 U | 7/2013 |
| CN | 104049822 A | 9/2014 |
| CN | 104199581 A | 12/2014 |
| CN | 106663202 A | 5/2017 |
| CN | 206440771 U | 8/2017 |
| CN | 107192850 A | 9/2017 |
| CN | 107560640 A | 1/2018 |
| CN | 107820570 A | 3/2018 |
| KR | 20140101470 A | 8/2014 |

* cited by examiner

*Primary Examiner* — Insa Sadio

(57) ABSTRACT

The present disclosure provides a capacitance detection circuit, which includes a front end circuit and a processing circuit; where the front end circuit comprises a first driving circuit, a first cancel circuit and a PGA circuit, the first driving circuit, the first cancel circuit and the PGA circuit are connected to a first end of a detection capacitor, a second end of the detection capacitor is grounded, and the processing circuit is connected to an output end of the front end circuit, and configured to determine a capacitance variation of a capacitance of the detection capacitor with respect to the base capacitance according to a voltage signal output by the front end circuit.

20 Claims, 8 Drawing Sheets

CAPACITANCE DETECTION CIRCUIT, TOUCH DETECTION DEVICE AND TERMINAL DEVICE

CROSS-REFERENCE TO RELATED APPLICATIONS

This application is a continuation of International Application No. PCT/CN2018/081331, filed on Mar. 30, 2018, the disclosure of which is hereby incorporated by reference in its entirety.

TECHNICAL FIELD

The present application relates to the field of electronic technologies, and in particular, to a capacitance detection circuit, a touch detection device and a terminal device.

BACKGROUND

Capacitive sensors are widely used in the field of human-machine interaction of electronic products. Specifically, a capacitance (or referred to as a base capacitance or an initial capacitance) is formed between a detection electrode and ground. When a conductor (such as a finger) approaches or touches the detection electrode, a capacitance between the detection electrode and the ground changes. By detecting a variation of the capacitance, information that the conductor approaches or touches the detection electrode can be acquired, so as to determine user operation. However, since the base capacitance tends to be greater, and a capacitance variation caused when the conductor approaches or touches the detection electrode is less, sensitivity of an existing capacitance detection method is lower, and capacitance detection cannot be accurately performed.

SUMMARY

Embodiments of the present application provide a capacitance detection circuit, a touch detection device and a terminal device, which are capable of improving sensitivity of capacitance detection.

In a first aspect, provided is a capacitance detection circuit, configured to detect a capacitance of a detection capacitor, and the capacitance detection circuit includes a front end circuit and a processing circuit; where the front end circuit includes a first driving circuit, a first cancel circuit and a programmable gain amplification PGA circuit, the first driving circuit, the first cancel circuit and the PGA circuit are connected to a first end of the detection capacitor, a second end of the detection capacitor is grounded, the first driving circuit is configured to perform charging and discharging on the detection capacitor, the first cancel circuit is configured to cancel a base capacitance of the detection capacitor, and the PGA circuit is configured to convert a capacitance signal of the detection capacitor after the base capacitance is cancelled into a voltage signal; and the processing circuit is connected to an output end of the front end circuit, and configured to determine a capacitance variation of the capacitance of the detection capacitor with respect to the base capacitance according to a voltage signal output by the front end circuit.

Therefore, according to a capacitance detection circuit in an embodiment of the present application, a front end circuit performs cancellation on a base capacitance of a detection capacitor before converting a capacitance signal into a voltage signal, so that a voltage signal received by a processing circuit from the front end circuit can directly reflect a variation of a capacitance of the detection capacitor with respect to the base capacitance, thereby implementing the cancellation of the base capacitance in a capacitance detection process, and improving sensitivity of capacitance detection to obtain a more accurate measurement result.

With reference to the first aspect, in one possible implementation manner of the first aspect, the first cancel circuit includes a first cancel capacitor, a first cancel resistor or a first current source.

With reference to the first aspect or the foregoing any one possible implementation manner, in another possible implementation manner of the first aspect, the capacitance detection circuit further includes a control circuit. In a first phase, the control circuit is configured to control the first driving circuit to charge the detection capacitor; in a second phase, the control circuit is configured to control the detection capacitor to discharge to the first cancel circuit, where a quantity of charges transferred in a process that the detection capacitor discharges to the first cancel circuit is a quantity of charges corresponding to the base capacitance of the detection capacitor; and in a third phase, the control circuit is configured to control the PGA circuit to convert a capacitance signal of the detection capacitor after the discharging into the voltage signal.

With reference to the first aspect or the foregoing any one possible implementation manner, in another possible implementation manner of the first aspect, the capacitance detection circuit further includes a control circuit. In a first phase, the control circuit is configured to control the detection capacitor to discharge to the first driving circuit; in a second phase, the control circuit is configured to control the first cancel circuit to charge the detection capacitor, where a quantity of charges transferred in a process that the first cancel circuit charges the detection capacitor is a quantity of charges corresponding to the base capacitance of the detection capacitor; and in a third phase, the control circuit is configured to control the PGA circuit to convert a capacitance signal of the detection capacitor after the charging into the voltage signal.

With reference to the first aspect or the foregoing any one possible implementation manner, in another possible implementation manner of the first aspect, the control circuit includes a first switch, a second switch, and a third switch. The first driving circuit is connected to the first end of the detection capacitor through the first switch, the first cancel circuit is connected to the first end of the detection capacitor through the second switch, one input end of the PGA circuit is connected to the first end of the detection capacitor through the third switch, and an input voltage of the other input end of the PGA circuit is a predetermined voltage.

With reference to the first aspect or the foregoing any one possible implementation manner, in another possible implementation manner of the first aspect, in the first phase, the first switch is turned on, and the second switch and the third switch are turned off; in the second phase, the second switch is turned on, and the first switch and the third switch are turned off; and in the third phase, the third switch is turned on, and the first switch and the second switch are turned off; or in the third phase, the second switch and the third switch are turned on, and the first switch is turned off.

With reference to the first aspect or the foregoing any one possible implementation manner, in another possible implementation manner of the first aspect, when the first cancel circuit includes a first cancel capacitor, the second switch and the third switch are turned on in the third phase, and the first switch is turned off in the third phase, where the PGA circuit converts capacitance signals of the detection capacitor and the first cancel capacitor into the voltage signal in the third phase; and when the first cancel circuit includes a first cancel resistor or a first current source, the third switch is turned on in the third phase, and the first switch and the second switch is turned off in the third phase.

With reference to the first aspect or the foregoing any one possible implementation manner, in another possible implementation manner of the first aspect, the front end circuit further includes a second driving circuit and a second cancel circuit, and the second driving circuit and the second cancel circuit are connected to the first end of the detection capacitor. The second driving circuit is configured to perform charging and discharging on the detection capacitor, the second cancel circuit is configured to cancel the base capacitance of the detection capacitor, and the PGA circuit is configured to convert a capacitance signal of the detection capacitor after the base capacitance is cancelled into a voltage signal.

With reference to the first aspect or the foregoing any one possible implementation manner, in another possible implementation manner of the first aspect, the second cancel circuit includes a second cancel capacitor, a second cancel resistor or a second current source.

With reference to the first aspect or the foregoing any one possible implementation manner, in another possible implementation manner of the first aspect, in a fourth phase, a control circuit is configured to control the detection capacitor to discharge to the second driving circuit; in a fifth phase, the control circuit is configured to control the second cancel circuit to charge the detection capacitor, where a quantity of charges transferred in a process that the second cancel circuit charges the detection capacitor is a quantity of charges corresponding to the base capacitance of the detection capacitor; and in a sixth phase, the control circuit is configured to control the PGA circuit to convert a capacitance signal of the detection capacitor after the charging into the voltage signal.

With reference to the first aspect or the foregoing any one possible implementation manner, in another possible implementation manner of the first aspect, in a fourth phase, a control circuit is configured to control the second driving circuit to charge the detection capacitor; in a fifth phase, the control circuit is configured to control the detection capacitor to discharge to the second cancel circuit, where a quantity of charges transferred in a process that the detection capacitor discharges to the second cancel circuit is a quantity of charges corresponding to the base capacitance of the detection capacitor; and in a sixth phase, the control circuit is configured to control the PGA circuit to convert a capacitance signal of the detection capacitor after the discharging into the voltage signal.

With reference to the first aspect or the foregoing any one possible implementation manner, in another possible implementation manner of the first aspect, the control circuit further includes a fourth switch and a fifth switch. The second driving circuit is connected to the first end of the detection capacitor through the fourth switch, and the second cancel circuit is connected to the first end of the detection capacitor through the fifth switch.

With reference to the first aspect or the foregoing any one possible implementation manner, in another possible implementation manner of the first aspect, in the fourth phase, the fourth switch is turned on, and the fifth switch and the third switch are turned off; in the fifth phase, the fifth switch is turned on, and the fourth switch and the third switch are turned off; and in the sixth phase, the third switch is turned on, and the fifth switch and the fourth switch are turned off; or in the sixth phase, the fifth switch and the third switch is turned on, and the fourth switch is turned off.

With reference to the first aspect or the foregoing any one possible implementation manner, in another possible implementation manner of the first aspect, when the first cancel circuit includes a second cancel capacitor, the fifth switch and the third switch are turned on in the sixth phase, and the fourth switch is turned off in the sixth phase, where the PGA circuit converts capacitance signals of the detection capacitor and the second cancel capacitor into the voltage signal in the sixth phase; and when the second cancel circuit includes a second cancel resistor or a second current source, the third switch is turned on in the sixth phase, and the fourth switch and the fifth switch is turned off in the sixth phase.

With reference to the first aspect or the foregoing any one possible implementation manner, in another possible implementation manner of the first aspect, the processing circuit is particularly configured to: determine a capacitance variation of the capacitance of the detection capacitor with respect to the base capacitance according to a difference value between the voltage signals output by the front end circuit in the third phase and the sixth phase.

With reference to the first aspect or the foregoing any one possible implementation manner, in another possible implementation manner of the first aspect, the front end circuit further includes a filter circuit and/or an integrating circuit, where the filter circuit is configured to filter an interference signal in the voltage signal output by the front end circuit, and the first integrating circuit is configured to perform integration and amplification processing on the voltage signal output by the front end circuit.

In a second aspect, an embodiment of the present application provides a touch detection device, including: the capacitance detection circuit according to the first aspect or any one possible implementation manner of the first aspect, where the touch detection device determines a touch position of a user according to a capacitance variation of the detection capacitor with respect to a base capacitance that is determined by the capacitance detection circuit.

In a third aspect, an embodiment of the present application provides a terminal device, including the touch detection device according to the second aspect.

According to a terminal device in an embodiment of the present application, a touch position of a user on a touch detection device can be determined more accurately, an influence of a base capacitance on touch control sensitivity is overcome, the touch control sensitivity of the terminal device is improved, and then an existing base capacitance detection device can be optimized.

DESCRIPTION OF EMBODIMENTS

A schematic diagram of one possible application scenario of a capacitance detection circuit according to an embodiment of the present application is described with reference to FIG. 1.

It should be understood that a capacitance of a capacitor may also be referred to as a capacitance value. Hereinafter, for ease of description, a capacitor and a capacitance of the capacitor will be described as an example.

Figure 1:
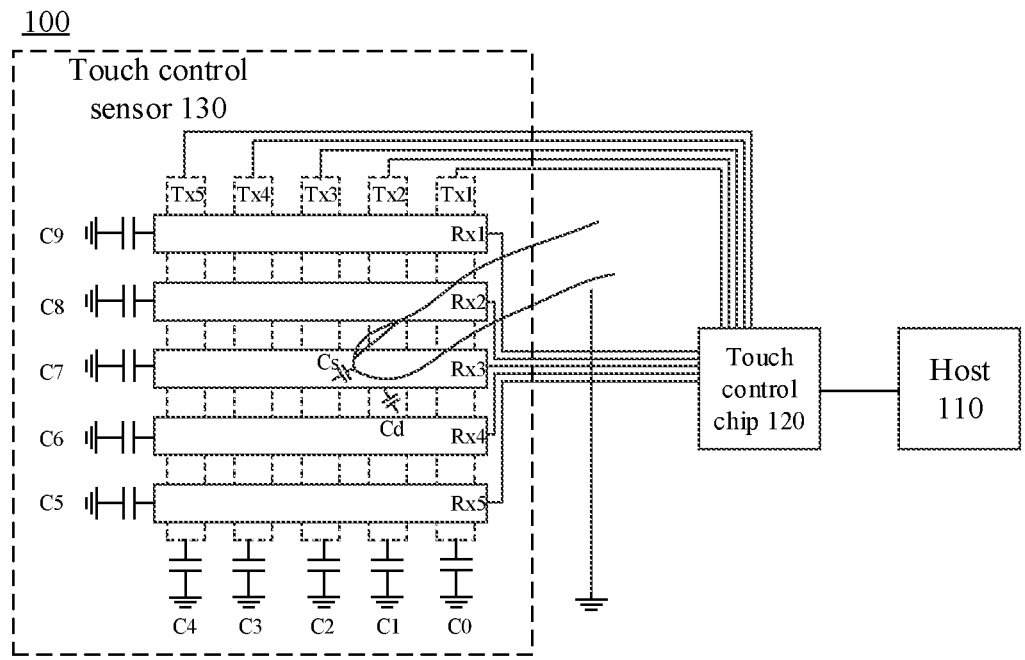
FIG. 1 is a schematic diagram of one possible application scenario of a capacitance detection circuit according to an embodiment of the present application.

FIG. 1 shows a capacitance detection device 100, the capacitance detection device 100 includes a host (Host) 110, a touch control chip (Touch IC) 120, and a touch control sensor (sensor) 130. The touch control sensor (or referred to as a touch detection device) 130 has a two-layer structure, and includes a driving channel (Tx) layer and a sensing channel (Rx) layer, where the Tx layer includes a Tx1 channel, a Tx2 channel, a Tx3 channel, a Tx4 channel and a Tx5 channel, and the Rx layer includes an Rx1 channel, an Rx2 channel, an Rx3 channel, an Rx4 channel and an Rx5 channel. In the Tx layer, capacitances to earth of the Tx1 channel, the Tx2 channel, the Tx3 channel, the Tx4 channel and the Tx5 channel are C0, C1, C2, C3 and C4, respectively; and in the Rx layer, capacitances to earth of the Rx1 channel, the Rx2 channel, the Rx3 channel, the Rx4 channel and the Rx5 channel are C9, C8, C7, C6 and C5, respectively. In the touch control sensor 130, each Tx channel is connected to the touch control chip 120, and each Rx channel is connected to the touch control chip 120. The touch control chip 120 is connected to the host 110, and can communicate with the host 110. In self-capacitance detection, what is detected is a capacitance variation of each electrode of channel to ground; and in mutual capacitance detection, what is detected is a mutual capacitance variation between a Tx channel and an Rx channel.

For example, when self-capacitance detection is performed, the touch control chip 120 scans capacitance variations of each Tx channel and each Rx channel to the ground; when a finger approaches or contacts a channel, self-capacitances of the channel near the finger would be greater, a capacitance Cd would be generated by the finger and a Tx channel, and a capacitance Cs would be generated by the finger and an Rx channel; and since a human body is electrically conductive and connected to the ground, a self-capacitance of the channel Tx2 that the finger approaches or contacts would vary from C1 to C1+Cd, and a self-capacitance of the Rx3 channel would vary from C7 to C7+Cs. The touch control chip 120 detects a self-capacitance variation of each channel, and a position where the finger touches can be calculated. If a base capacitance formed between a channel and the ground (that is, a self-capacitance formed when no conductor approaches or is touched) is too great, and a capacitance variation caused by approaching or a touch of the finger is less, it is difficult for the touch control chip 120 to detect a capacitance variation of a channel that is caused by the approaching or the touch of the finger, and the position where the finger touches cannot be calculated.

Since the base capacitance is relatively great, and the capacitance variation caused by the approaching or the touch of the finger is relatively less, an existing self-capacitance detection method has a problem of low touch control sensitivity.

Therefore, an embodiment of the present application provides a capacitance detection circuit; by performing cancellation on a base capacitance of a detection capacitor before a capacitance signal is converted into a voltage signal, a collected voltage signal can directly reflect a variation of a capacitance of the detection capacitor with respect to the base capacitance, thereby implementing the cancellation of the base capacitance in a capacitance detection process, and improving sensitivity of capacitance detection. Especially in a case of a greater self-capacitance, when a capacitance variation caused when a conductor approaches or touches a detection electrode is relatively less, the capacitance variation can still be obtained more accurately, thereby improving touch control sensitivity to obtain a more accurate measurement result.

It should be understood that the capacitor detection circuit according to the embodiment of the present application can be applied to any scenario in which capacitance detection is required, the embodiment of the present application is described with an example that the capacitance detection circuit is applied to a touch detection device, and the embodiment of the present application is not limited thereto. When the capacitance detection circuit is applied to a touch detection device, the detection capacitor is a detection electrode in the touch detection device, such as each channel shown in FIG. 1.

Hereinafter, a capacitance detection circuit according to an embodiment of the present application will be described in detail with reference to FIG. 2 to FIG. 14.

Figure 2:
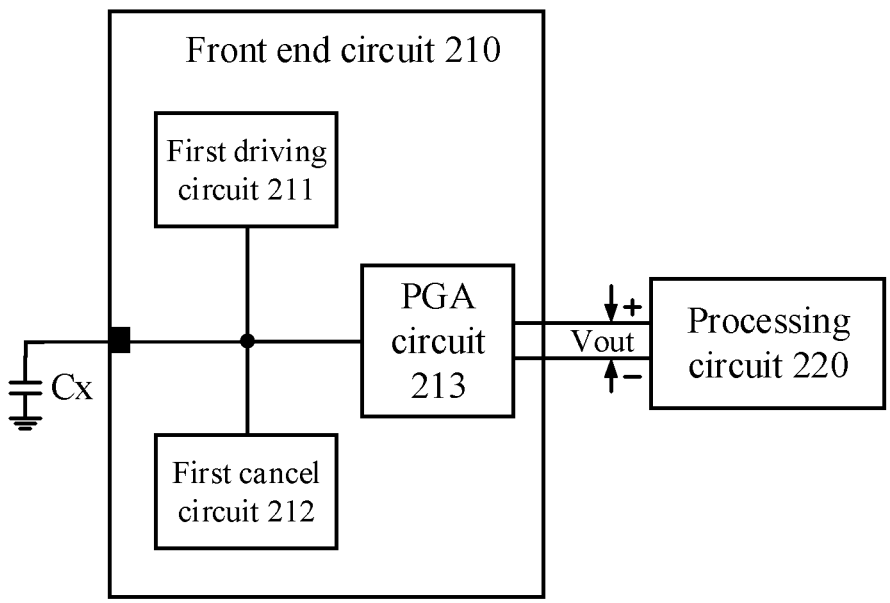
FIG. 2 is a schematic block diagram of a capacitance detection circuit according to an embodiment of the present application.

FIG. 2 is a schematic structural diagram of a capacitance detection circuit 200 according to an embodiment of the present application. The capacitance detection circuit 200 is configured to detect a capacitance of a detection capacitor Cx. As shown in FIG. 2, the capacitance detection circuit 200 includes a front end circuit 210 and a processing circuit 220.

The front end circuit 210 includes a first driving circuit 211, a first cancel circuit 212 and a programmable gain amplification PGA circuit 213, the first driving circuit 211, the first cancel circuit 212 and the PGA circuit 213 are connected to a first end of the detection capacitor Cx, and a second end of the detection capacitor Cx is grounded.

The first driving circuit 211 is configured to perform charging and discharging on the detection capacitor Cx; and the first cancel circuit 212 is configured to cancel a base capacitance of the detection capacitor Cx, and the PGA circuit 213 is configured to convert a capacitance signal of the detection capacitor Cx after the base capacitance is cancelled into a voltage signal.

The processing circuit 220 is connected to an output end of the front end circuit 210, and configured to determine a capacitance variation ΔCx of the capacitance of the detection capacitor Cx with respect to the base capacitance according to a voltage signal output by the front end circuit 210.

Optionally, the processing circuit 220 may be, for example, a digital processing block.

It should be understood that the processing circuit 220 has a computing function and a storage function.

Optionally, the processing circuit 220 may have a demodulation function, that is, an ability to demodulate a signal.

It should be understood that the voltage signal output by the front end circuit 210 that is received by the processing circuit 220 is a signal after analog to digital conversion.

For example, the analog to digital conversion of the voltage signal may be implemented by an analog to digital conversion ADC circuit.

Therefore, in a capacitance detection circuit in the embodiment of the present application, a front end circuit (or referred to as a front stage circuit) performs cancellation on a base capacitance of a detection capacitor before converting a capacitance signal into a voltage signal, so that a voltage signal received by a processing circuit from the front end circuit can directly reflect a variation of a capacitance of the detection capacitor with respect to the base capacitance, thereby implementing the cancellation (cancel) of the base capacitance in a capacitance detection process, and improving sensitivity of capacitance detection to obtain a more accurate measurement result.

Figure 3:
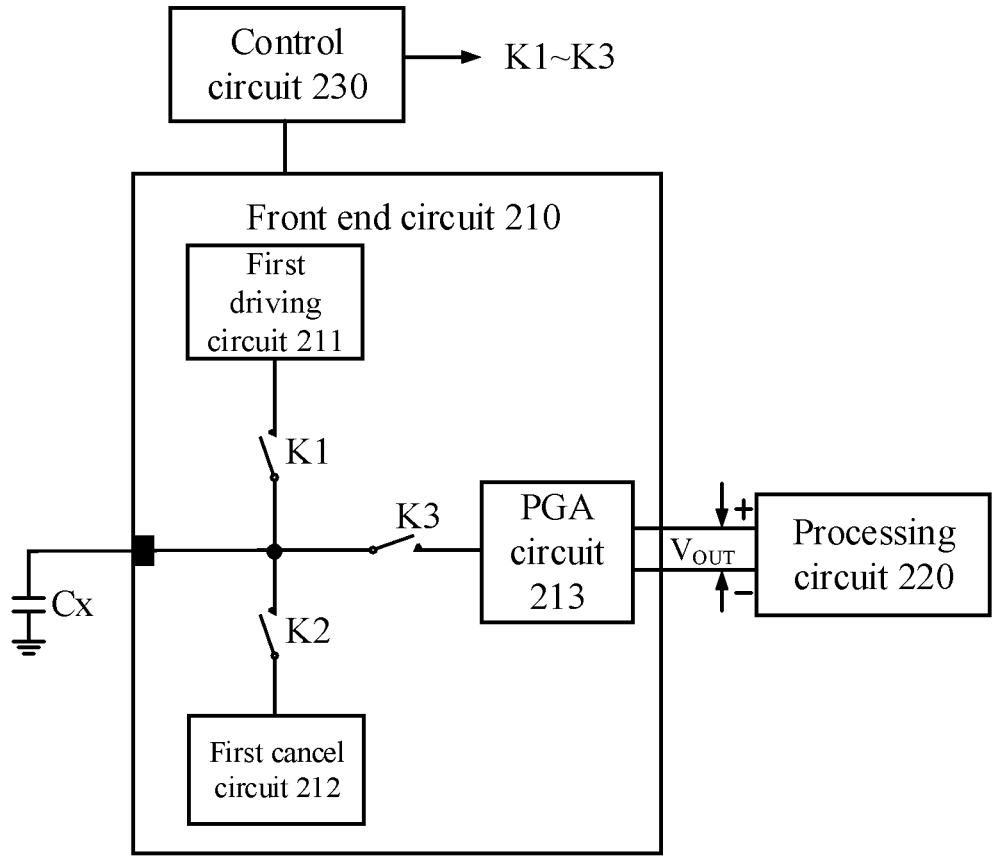
FIG. 3 is an exemplary schematic structural diagram of a capacitance detection circuit according to an embodiment of the present application.

Optionally, as shown in FIG. 3, the capacitance detection circuit 200 further includes a control circuit 230.

In a first phase t1, the control circuit 230 is configured to control the first driving circuit 211 to charge the detection capacitor Cx; in a second phase t2, the control circuit 230 is configured to control the detection capacitor Cx to discharge to the first cancel circuit 212, where a quantity of charges transferred in a process that the detection capacitor Cx discharges to the first cancel circuit 212 is a quantity of charges corresponding to the base capacitance of the detection capacitor Cx; and in a third phase t3, the control circuit 230 is configured to control the PGA circuit 213 to convert a capacitance signal corresponding to the detection capacitor Cx after the discharging into the voltage signal.

Alternatively, optionally, in the first phase t1, the control circuit 230 is configured to control the detection capacitor Cx to discharge to the first driving circuit 211; in the second phase t2, the control circuit 230 is configured to control the first cancel circuit 212 to charge the detection capacitor Cx, where a quantity of charges transferred in a process that the first cancel circuit 212 charges the detection capacitor Cx is a quantity of charges corresponding to the base capacitance of the detection capacitor Cx; and in the third phase t3, the control circuit 230 is configured to control the PGA circuit 213 to convert a capacitance signal corresponding to the detection capacitor Cx after the charging into the voltage signal.

Particularly, the first driving circuit 211 may charge the detection capacitor Cx in the first phase t1, and the detection capacitor Cx discharges to the first cancel circuit 212 in the second t2; or the detection capacitor Cx discharges the first driving circuit 211 in the first phase t1, and the first cancel circuit 212 charges the detection capacitor Cx in the second phase t2. The quantity of charges transferred when the detection capacitor Cx discharges to the first cancel circuit 212 or the first cancel circuit 212 charges the detection capacitor Cx should be the quantity of charges corresponding to the base capacitance of the detection capacitor Cx. Thus, when the capacitance of the detection capacitor Cx does not change, that is, the capacitance of the detection capacitor Cx is equal to the base capacitance, a voltage signal output by the PGA circuit 213 is zero; however, when the capacitance of the detection capacitor Cx changes (the variation ΔCx), the voltage signal output by the PGA circuit 213 is a voltage signal corresponding to ΔCx.

Therefore, the first cancel circuit 212 cancels the base capacitance of the detection capacitor Cx (or it may also be described that a contribution of the base capacitance of the detection capacitor Cx to an output voltage of the PGA circuit 213 is zero), and a voltage signal output by the front end circuit 210 to the PGA circuit 213 is the voltage signal corresponding to the capacitance variation ΔCx of the detection capacitor Cx, thereby implementing the cancellation of the base capacitance in a capacitance detection process, and improving sensitivity of capacitance detection. Since the cancellation of the base capacitance of the detection capacitor Cx is performed before the PGA circuit 213 converts the capacitance signal into the voltage signal, noise could be suppressed.

Optionally, as shown in FIG. 3, the control circuit 230 includes a first switch K1, a second switch K2 and a third switch K3. The first driving circuit 211 is connected to the first end of the detection capacitor Cx through the first switch K1, the first cancel circuit 212 is connected to the first end of the detection capacitor Cx through the second switch K2, one input end of the PGA circuit 213 is connected to the first end of the detection capacitor Cx through the third switch K3, and an input voltage of the other input end of the PGA circuit 213 is a predetermined voltage $V_{CM}$.

For example, the predetermined voltage $V_{CM}$ is a voltage at an intermediate point of operation of the PGA circuit 213.

Figure 4:
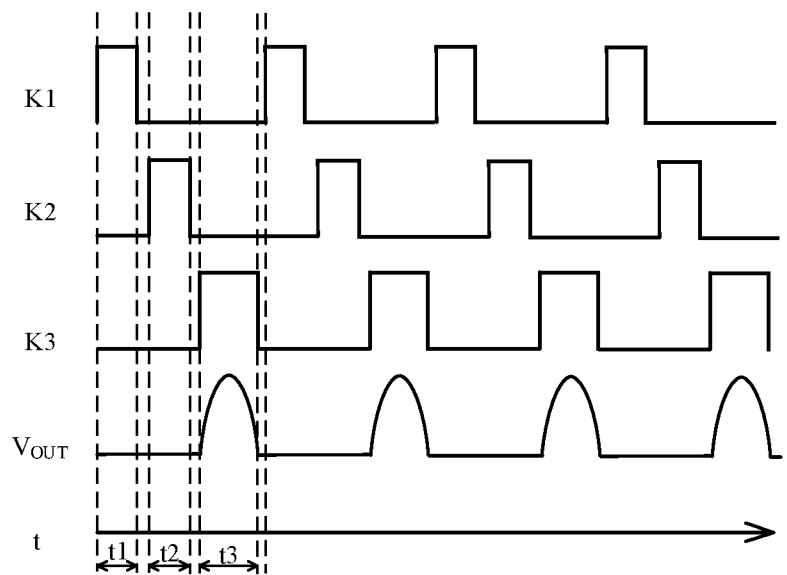
FIG. 4 is a logic timing diagram of a capacitance detection circuit according to an embodiment of the present application.

With reference to a timing diagram shown in FIG. 4, in a first phase t1, the first switch K1 is turned on, and the second switch K2 and the third switch K3 are turned off, so that the first driving circuit 211 charges the detection capacitor Cx, for example, to a power supply voltage $V_{CC}$; in a second phase t2, the first switch K1 and the third switch K3 are turned off, the second switch K2 is turned on, and charges on the detection capacitor Cx are transferred to the first cancel circuit 212; in a third phase t3, the first switch K1 is turned off, the second switch K2 and the third switch K3 are turned on; or in the third phase t3, the first switch K1 and the second switch K2 are turned off, and the third switch K3 is turned on, so that charges on the detection capacitor Cx that are not transferred by the first cancel circuit 212 are transferred to the PGA circuit 213. The PGA circuit 213 converts a current capacitance signal of the detection capacitor Cx into a voltage signal, and outputs $V_{OUT}$. $V_{OUT}$ is a voltage corresponding to the capacitance variation ΔCx of the detection capacitor Cx. The processing circuit 220 can determine the capacitance variation ΔCx of the detection capacitor Cx according to a magnitude of $V_{OUT}$ output by the front end circuit 210.

Alternatively, in the first phase t1, the first switch K1 is turned on, and the second switch K2 and the third switch K3 are turned off, so that the detection capacitor discharges to the first driving circuit, for example, until a voltage is 0; in the second phase t2, the first switch K1 and the third switch K3 are turned off, the second switch K2 is turned on, and the first cancel circuit 212 charges the detection capacitor Cx; in the third phase t3, the first switch K1 is turned off, and the second switch K2 and the third switch K3 are turned on; or in the third phase t3, the first switch K1 and the second switch K2 are turned off, and the third switch K3 is turned on, so that the charges on the detection capacitor Cx that are not transferred by the first cancel circuit 212 are transferred to the PGA circuit 213. A quantity of charges transferred in a process that the first cancel circuit 212 charges the detection capacitor Cx is a quantity of charges corresponding to the base capacitance of the detection capacitor Cx. The PGA circuit 213 converts a current capacitance signal of the detection capacitor Cx into a voltage signal, and outputs $V_{OUT}$. $V_{OUT}$ is a voltage corresponding to the capacitance variation ΔCx of the detection capacitor Cx. The processing circuit 220 can determine the capacitance variation ΔCx of the detection capacitor Cx according to a magnitude of $V_{OUT}$ output by the front end circuit 210.

In the embodiment of the present application, the first cancel circuit 212 may include a first cancel capacitor, a first cancel resistor or a first current source. The first cancel capacitor, the first cancel resistor or the first current source may be configured to perform the cancellation of the base capacitance of the detection capacitor Cx.

Optionally, one end of the first cancel capacitor is connected to the first end of the detection capacitor Cx, and the other end of the first cancel capacitor is grounded; one end of the first cancel resistor is connected to the first end of the detection capacitor Cx, and the other end of the first cancel resistor is grounded; and one end of the first current source is connected to the first end of the detection capacitor Cx, and the other end of the first current source is grounded.

Optionally, when the first cancel circuit 212 includes the first cancel resistor or the first current source, the third switch K3 is turned on in the third phase t3, and the first switch K1 and the second switch K2 is turned off in the third phase t3, where the PGA circuit 213 converts a capacitance signal of the detection capacitor Cx into a voltage signal in the third phase t3; and when the first cancel circuit 212 includes the first cancel capacitor, the second switch K2 and the third switch K3 are turned on in the third phase, and the first switch K1 is turned off in the third phase, where the PGA circuit 213 converts capacitance signals of the detection capacitor Cx and the first cancel capacitor $C_C$ into the voltage signal in the third phase.

Several implementation manners of the first cancel circuit 212 are described below with reference to FIG. 5 to FIG. 12, respectively.

Manner 1

The first cancel circuit 212 includes a first cancel capacitor CC.

Figure 5:
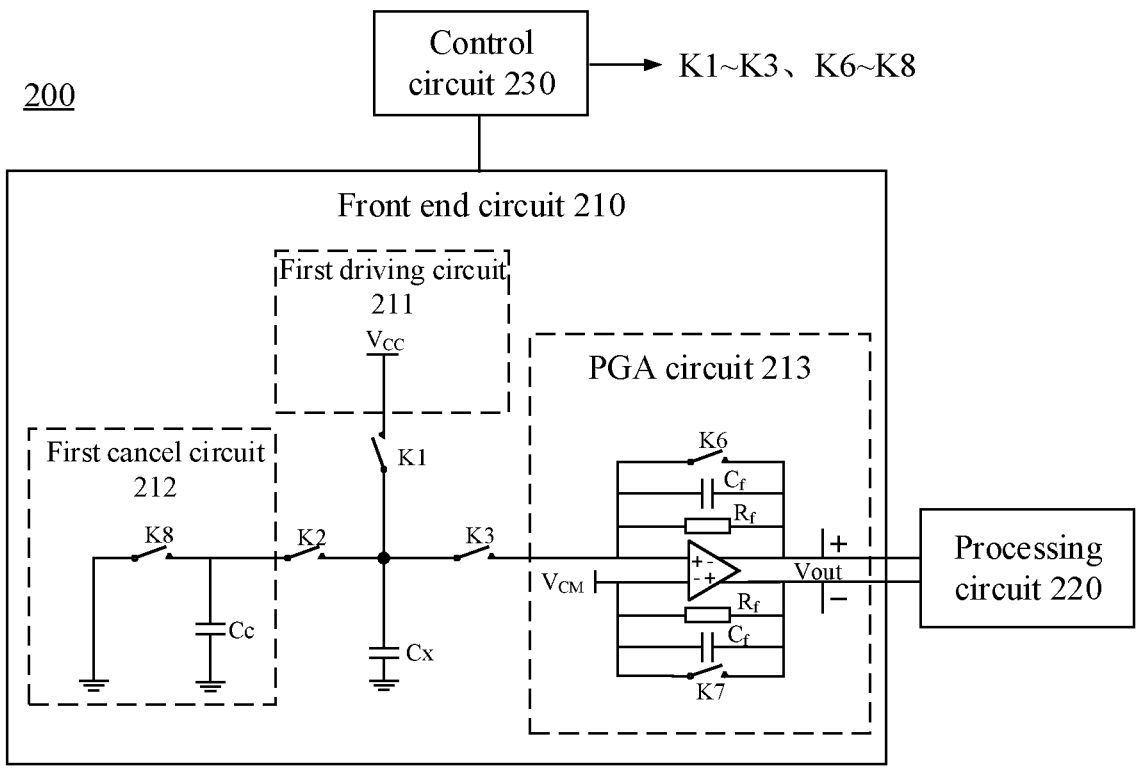
FIG. 5 is another exemplary schematic structural diagram of a capacitance detection circuit according to an embodiment of the present application.

For example, as shown in FIG. 5, the first driving circuit 211 is a power supply $V_{CC}$, and the power supply $V_{CC}$ is connected to a first end of a detection capacitor Cx through a first switch K1; the first cancel circuit 212 is the first cancel capacitor $C_C$, one end of the first cancel capacitor $C_C$ is grounded, and the other end of the first cancel capacitor $C_C$ is connected to the first end of the detection capacitor Cx through a second switch K2; and one input end of a PGA circuit 213 is connected to the first end of the detection capacitor Cx through a third switch K3, and an input voltage of the other input end of the PGA circuit 213 is equal to a predetermined voltage $V_{CM}$.

Figure 6:
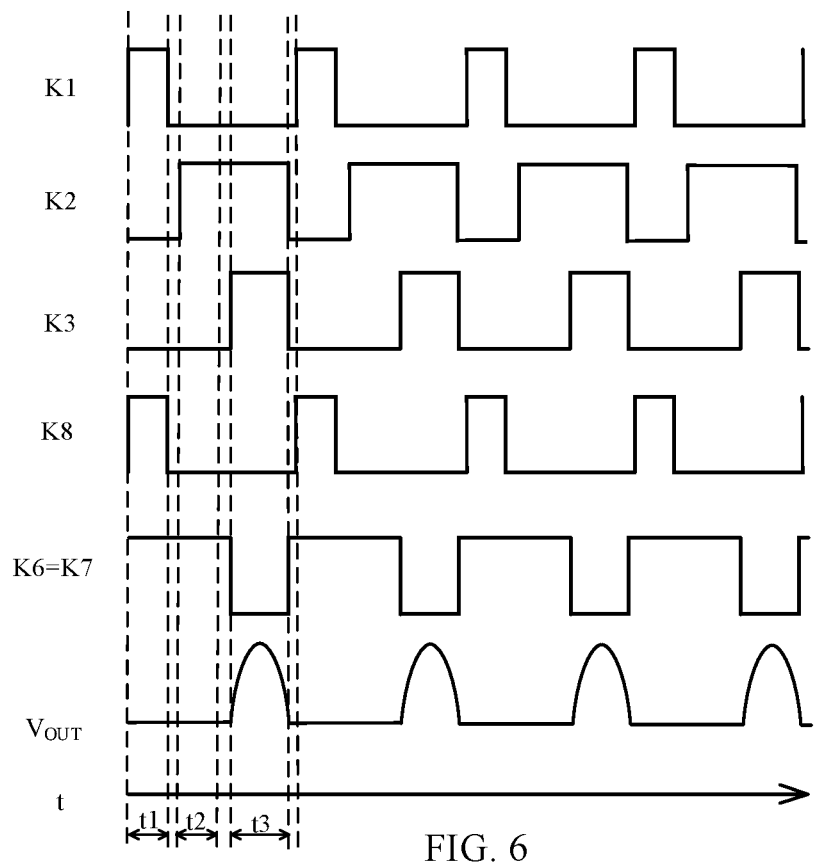
FIG. 6 is another logic timing diagram of a capacitance detection circuit according to an embodiment of the present application.

With reference to a timing diagram shown in FIG. 6, in a first phase t1, a control circuit 230 controls the first switch K1 to be turned on and the second switch K2 and the third switch K3 to be turned off, so that the first driving circuit 211 charges the detection capacitor Cx to $U_0$ (for example, $U_0=V_{CC}$).

In a second phase t2, the first switch K1 and the third switch K3 are turned off, the second switch K2 is turned on, and charges on the detection capacitor Cx are transferred to the first cancel capacitor $C_C$.

In this case, a voltage Ux of the detection capacitor Cx is equal to $U_0 \times (C_0+\Delta Cx)/(C_0+\Delta Cx+C_C)$, where C0 is a base capacitance of the detection capacitor Cx, and ΔCx is a capacitance variation of the detection capacitor Cx.

In a third phase, the first switch K1 is turned off, the second switch K2 and the third switch K3 are turned on, and the PGA circuit 213 converts a capacitance signal corresponding to the detection capacitor Cx into a voltage signal and outputs $V_{OUT}$.

How to determine a magnitude of a capacitance of the first cancel capacitance $C_C$ is described below with an example that the capacitance detection circuit is applied to the touch detection device shown in FIG. 1. When no finger is touched or approaches (that is, ΔCx=0), the magnitude of the capacitance of the first cancel capacitor $C_C$ is adjusted, so that the voltage Ux of the detection capacitor Cx is equal to $V_{CM}$, that is, $Ux=U_0 \times C_0/(C_0+C_C)=V_{CM}$, thereby obtaining that the magnitude of the capacitance of the first cancel capacitor $C_C$ is equal to $(U_0-V_{CM}) \times C_0/V_{CM}$. In this case, the detection capacitor Cx and the first cancel capacitor $C_C$ would not release charges to or absorb charges from the PGA circuit 213, or cancellation by the first cancel capacitance $C_C$ to the detection capacitor Cx is perfect, and the voltage $V_{OUT}$ output by the PGA circuit 213 is equal to 0V.

The magnitude of the capacitance of the first cancel capacitor $C_C$ is constant, and a capacitance of the detection capacitor Cx is detected according to the operations during the foregoing three phases. When the finger is touched or approaches (that is, ΔCx·0), if $Ux>V_{CM}$, the detection capacitor Cx and the first cancel capacitor $C_C$ would release charges to a feedback resistor $R_f$ and a capacitor $C_f$ of the PGA circuit 213 until the voltage Ux of the detection capacitor Cx reaches $V_{CM}$, and in this case, the PGA circuit 213 would output a negative going voltage $V_{OUT}$. According to conservation of charge, charges Qx that are released by the detection capacitor Cx to the PGA circuit 213 are equal to $U_0 \times (C_0+\Delta Cx)-V_{CM}[\times(C_0+\Delta Cx)+C_C]$, and according to $C_C=(U_0-V_{CM}) \times C_0/V_{CM}$, $Qx=(U_0-V_{CM}) \times \Delta Cx$ is obtained.

It can be seen that a quantity of charges Qx released by the detection capacitor Cx and the first cancel capacitor $C_C$ to the PGA circuit 213 is merely related to the capacitance variation ΔCx of the detection capacitor Cx, and is independent of the base capacitance $C_0$ of the detection capacitor Cx. Therefore, the voltage $V_{OUT}$ output by the PGA circuit 213 directly reflects the capacitance variation ΔCx of the detection capacitor Cx.

Similarly, if $Ux<V_{CM}$, the PGA circuit 213 would release charges to the detection capacitor Cx and the first cancel capacitor $C_C$ though the feedback resistor $R_f$ and the capacitor $C_f$ thereof until the voltage Ux of the detection capacitor Cx reaches $V_{CM}$, and in this case, the PGA circuit 213 would output a positive going voltage $V_{OUT}$. According to conservation of charge, charges Qx that are absorbed by the detection capacitor Cx are equal to $V_{CM} \times [(C_0+\Delta Cx)+C_C] - U_0 \times (C_0+\Delta Cx)$, and according to $C_C=(U_0-V_{CM}) \times C_0/V_{CM}$, $Qx=(V_{CM}-U_0) \times \Delta Cx$ is obtained.

It can be seen that a quantity of charges Qx released by the PGA circuit 213 to the detection capacitor Cx and the first cancel capacitor $C_C$ is merely related to the capacitance variation $\Delta Cx$ of the detection capacitor Cx, and is independent of the base capacitance $C_0$ of the detection capacitor Cx. Therefore, the voltage $V_{OUT}$ output by the PGA circuit 213 directly reflects the capacitance variation $\Delta Cx$ of the detection capacitor Cx.

Optionally, the other end of the first cancel capacitor $C_C$ may further be ground through an eighth switch K8, and the eighth switch K8 may be turned on in the first phase t1, so that the first cancel capacitor $C_C$ is discharged to 0, and a reset of the first cancel capacitor $C_C$ is implemented.

Optionally, the PGA circuit 213 may include an operational amplifier OP and the feedback resistor $R_f$ and the capacitor $C_f$ that are across two ends of the operational amplifier. In addition, optionally, switches are also connected between an input end and an output end of the operational amplifier, such as switches K6 and K7 in FIG. 5. When K6 and K7 are present, K6 and K7 may be turned on in the first phase t1 and the second phase t2, and turned off in the third phase t3.

In the manner 1, since the base capacitance of the detection capacitor Cx is directly cancelled by using the first cancel capacitor $C_C$, which is implemented without a need to use another active device, and is advantageous for reducing noise of a circuit.

It should be understood that, in the manner 1, when the detection capacitor Cx is detected, in the third phase t3, it is also possible that the first switch K1 and the second switch K2 are turned off, and the third switch K3 is turned on, so that charges on the detection capacitor Cx that are not transferred by the first cancel capacitor $C_C$ in the second phase t2, that is, charges corresponding to the capacitance variation $\Delta Cx$, is transferred to the PGA circuit 213, which is not limited in the present application.

Manner 2

The first cancel circuit 212 includes a first current source $I_1$.

Figure 7:
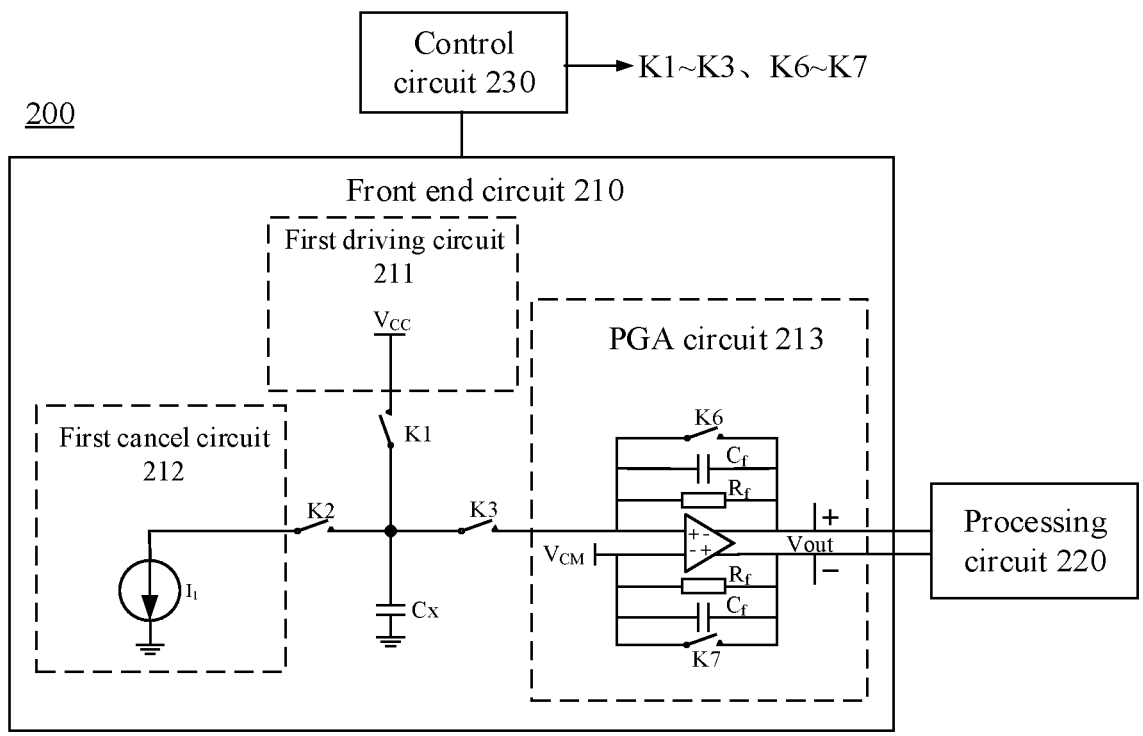
FIG. 7 is another exemplary schematic structural diagram of a capacitance detection circuit according to an embodiment of the present application.

For example, as shown in FIG. 7, the first driving circuit 211 is a power supply $V_{CC}$, and the power supply $V_{CC}$ is connected to a first end of a detection capacitor Cx through a first switch K1; the first cancel circuit 212 is the first current source $I_1$, and one end of the first current source $I_1$ is ground, the other end of the first current source $I_1$ is connected to the first end of the detection capacitor Cx through a second switch K2; and one input end of a PGA circuit 213 is connected to the first end of the detection capacitor Cx through a third switch K3, and an input voltage of the other input end of the PGA circuit 213 is equal to a predetermined voltage $V_{CM}$.

Figure 8:
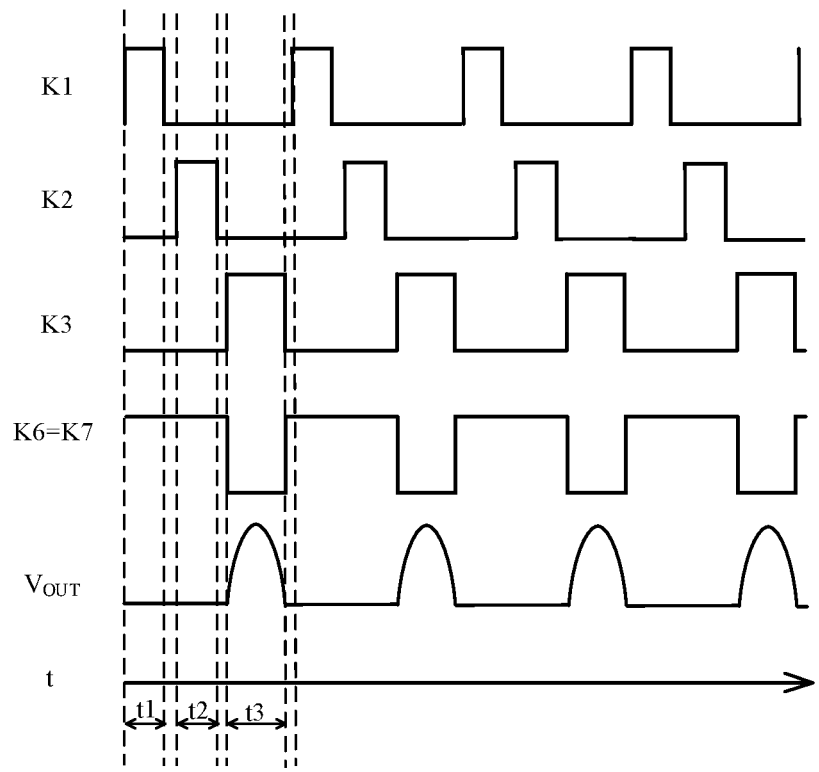
FIG. 8 is another logic timing diagram of a capacitance detection circuit according to an embodiment of the present application.

With reference to a timing diagram shown in FIG. 8, in a first phase t1, the first switch K1 is turned on, and the second switch K2 and the third switch K3 are turned off, so that the first driving circuit 211 charges the capacitor to be detected Cx to $U_0$ (for example, $U_0=V_{CC}$).

In this case, a quantity of charges $Q_0$ of the detection capacitor Cx is equal to $(C_0+\Delta Cx) \times U_0$, where $C_0$ is a base capacitance of the detection capacitor Cx, and $\Delta Cx$ is a capacitance variation of the detection capacitor Cx.

In a second phase t2, the first switch K1 and the third switch K3 are turned off, the second switch K2 is turned on, and charges on the detection capacitor Cx are transferred to the first current source $I_1$.

In this case, a quantity of charges $Q_C$ that are transferred by the detection capacitor Cx is equal to $I_1 \times t2$, and a current of the first current source is $I_1$.

In this case, a voltage Ux of the detection capacitor Cx is equal to $(Q_0-Q_C)/(C_0+\Delta Cx)$.

In a third phase t3, the first switch K1 and the second switch K2 are turned off, the third switch K3 is turned on, and the PGA circuit 213 converts a capacitance signal corresponding to the detection capacitor Cx into a voltage signal and outputs $V_{OUT}$.

How to determine a magnitude of a current of the first current source $I_1$ is described below with an example that the capacitance detection circuit is applied to the touch detection device shown in FIG. 1. When no finger is touched or approaches (that is, $\Delta Cx=0$), the magnitude of the current of the first current source $I_1$ and/or duration of the second phase t2 are/is adjusted, so that the voltage Ux of the detection capacitor Cx is equal to $V_{CM}$, that is, $Ux=(Q_0-Q_C)/C_0=V_{CM}$, and $I_1 \times t2=(U0-V_{CM}) \times C_0$ is obtained. In this case, the detection capacitor Cx would not release charges to or absorb charges from the PGA circuit 213, or cancellation (cancel) by the first current source $I_1$ to the detection capacitor Cx is perfect, and the voltage $V_{OUT}$ output by the PGA circuit 213 is equal to 0V.

The magnitude of the current of the first current source $I_1$ and the duration of the second phase t2 are constant, and a capacitance of the detection capacitor Cx is detected according to the operations during the foregoing three phases. When the finger is touched or approaches (that is, $\Delta Cx \cdot 0$), if $Ux>V_{CM}$, the detection capacitor Cx would release charges to a feedback resistor $R_f$ and a capacitor $C_f$ of the PGA circuit 213 until the voltage Ux of the detection capacitor Cx reaches $V_{CM}$, and in this case, the PGA circuit 213 would output a negative going voltage $V_{OUT}$ According to conservation of charge, charges Qx that are released by the detection capacitor Cx to the PGA circuit 213 is equal to $Q_0-Q_C-V_{CM} \times (C_0+\Delta Cx)$, and according to $I_1 \times t2=(U_0-V_{CM}) C_0$, $Qx=(U_0-V_{CM}) \times \Delta Cx$ is obtained.

It can be seen that the charges Qx released by the detection capacitor Cx to the PGA circuit 213 is merely related to the capacitance variation $\Delta Cx$ of the detection capacitor Cx, and is independent of the base capacitance $C_0$ of the detection capacitor Cx. Therefore, the voltage $V_{OUT}$ output by the PGA circuit 213 directly reflects the capacitance variation $\Delta Cx$ of the detection capacitor Cx.

Similarly, if $Ux<V_{CM}$, the PGA circuit 213 would release charges to the detection capacitor Cx though the feedback resistor $R_f$ and the capacitor $C_f$ thereof until the voltage Ux of the detection capacitor Cx reaches $V_{CM}$, and in this case, the PGA circuit 213 would output a positive going voltage $V_{OUT}$. According to conservation of charge, charges Qx that are absorbed by the detection capacitor Cx is equal to $-Q_0+Q_C+V_{CM} \times (C_0+\Delta Cx)$, and according to $I_1 \times t2=(U_0-V_{CM}) \times C_0$, $Qx=(V_{CM}-U_0) \times \Delta Cx$ is obtained.

It can be seen that the charges Qx released by the PGA circuit 213 to the detection capacitor Cx is merely related to the capacitance variation $\Delta Cx$ of the detection capacitor Cx, and is independent of the base capacitance $C_0$ of the detection capacitor Cx. Therefore, the voltage $V_{OUT}$ output by the PGA circuit 213 directly reflects the capacitance variation $\Delta Cx$ of the detection capacitor Cx.

Optionally, the PGA circuit 213 may include an operational amplifier and the feedback resistor $R_f$ and the capacitor $C_f$ that are across two ends of the operational amplifier. In addition, optionally, switches are also connected between an input end and an output end of the operational amplifier, such as switches K6 and K7 in FIG. 7; and when K6 and K7 are present, K6 and K7 may be turned on in the first phase t1 and the second phase t2, and turned off in the third phase t3.

In the manner 2, by turning on the first current source $I_1$ for a period of time t2, the function of the first cancel capacitor $C_C$ in the manner 1 is implemented, so that there is no need to use a first cancel capacitor $C_C$ with a great capacitance value, and a device cost is reduced.

Manner 3

The first cancel circuit 212 includes a first cancel resistor $R_C$.

Figure 9:
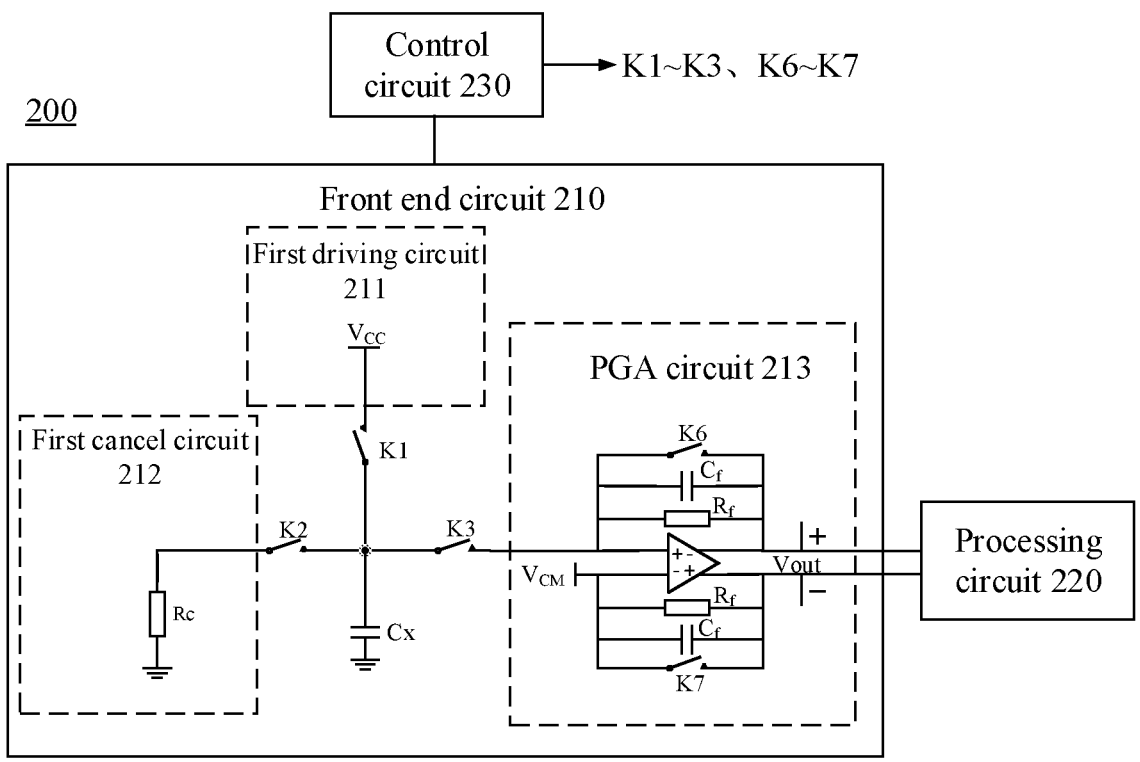
FIG. 9 is another exemplary schematic structural diagram of a capacitance detection circuit according to an embodiment of the present application.

For example, as shown in FIG. 9, the first driving circuit 211 is a power supply $V_{CC}$, and the power supply $V_{CC}$ is connected to a first end of a detection capacitor Cx through a first switch K1; a first cancel circuit 212 is the first cancel resistor $R_C$, one end of the first cancel resistor $R_C$ is grounded, and the other end of the first cancel resistor $R_C$ is connected to the first end of the detection capacitor Cx through a second switch K2; and one input end of a PGA circuit 213 is connected to the first end of the detection capacitor Cx through a third switch K3, and an input voltage of the other input end of the PGA circuit 213 is equal to a predetermined voltage $V_{CM}$.

Figure 10:
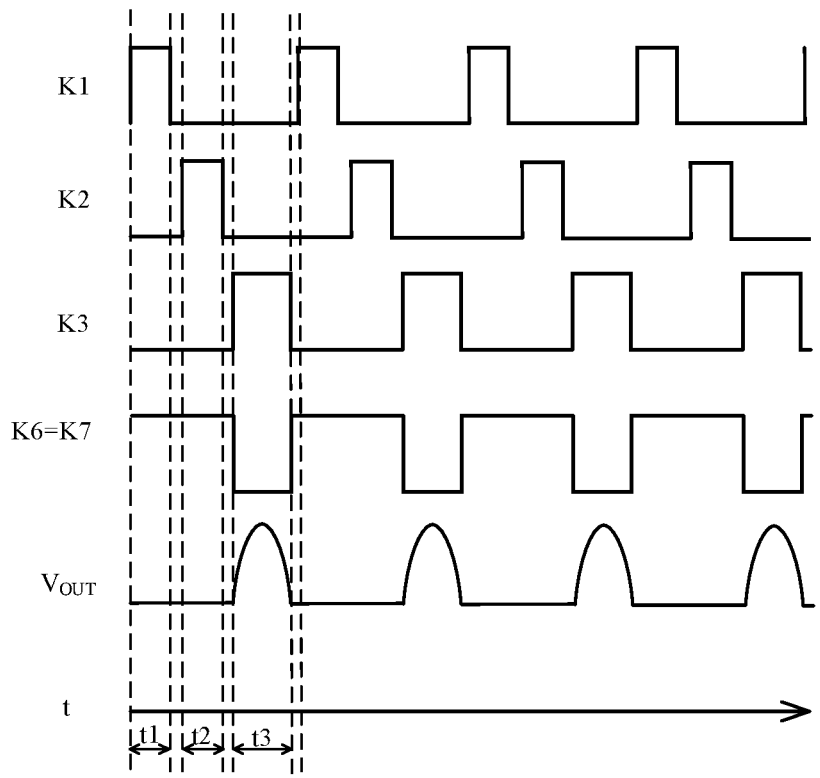
FIG. 10 is another logic timing diagram of a capacitance detection circuit according to an embodiment of the present application.

With reference to a timing diagram shown in FIG. 10, in a first phase t1, the first switch K1 is turned on, and the second switch K2 and the third switch K3 are turned off, so that the first driving circuit 211 charges the capacitor to be detected Cx to $U_0$ (for example, $U_0 = V_{CC}$).

In this case, a quantity of charges $Q_0$ of the detection capacitor Cx is equal to $(C_0 + \Delta Cx) \times U_0$, where $C_0$ is a base capacitance of the detection capacitor Cx, and $\Delta Cx$ is a capacitance variation of the detection capacitor Cx.

In a second phase t2, the first switch K1 and the third switch K3 are turned off, the second switch K2 is turned on, and the detection capacitor Cx releases charges to the ground through the first cancel resistor $R_C$.

In this case, a voltage Ux of the capacitance to be detected Cx is equal to $$U_0 \times e^{\frac{-t_2}{R_C \times (C_0 + \Delta C_x)}},$$

and a quantity of charges released by the capacitance to be detected Cx through the first cancel resistor $R_C$ is:

$$Q_C = \left(U_0 - U_0 \times e^{\frac{-t_2}{R_C \times (C_0 + \Delta C_x)}}\right) \times (C_0 + \Delta C_x).$$

In a third phase t3, the first switch K1 and the second switch K2 are turned off, the third switch K3 is turned on, and the PGA circuit 213 converts a capacitance signal corresponding to the detection capacitor Cx into a voltage signal and outputs $V_{OUT}$.

How to determine a magnitude of a resistance of the first cancel resistor $R_C$ is described below with an example that the capacitance detection circuit is applied to the touch detection device shown in FIG. 1. When no finger is touched or approaches (that is, $\Delta Cx=0$), the magnitude of the resistance of the first cancel resistor $R_C$ and/or duration of the second phase t2 are/is adjusted, so that the voltage Ux of the detection capacitor Cx is equal to $V_{CM}$, that is, $$U_X = U_0 \times e^{\frac{-t_2}{R_C \times C_0}} = V_{CM},$$

and it is obtained that values of $R_C$ and t2 satisfy $t_2/R_C = -C_0 \times \ln(V_{CM}/U_0)$.

In this case, the detection capacitor Cx would not release charges to or absorb charges from the PGA circuit 213, or cancellation (cancel) by the first cancel resistor $R_C$ to the detection capacitor Cx is perfect, and the voltage $V_{OUT}$ output by the PGA circuit 213 is equal to 0V.

The magnitude of the resistance of the first cancel resistance $R_C$ and the duration of the second phase t2 are constant, and a capacitance of the detection capacitor Cx is detected according to the operations during the foregoing three phases. When the finger is touched or approaches (that is, $\Delta Cx \cdot 0$), if $Ux > V_{CM}$, the detection capacitor Cx would release charges to a feedback resistor $R_f$ and a capacitor $C_f$ of the PGA circuit 213 until the voltage Ux of the detection capacitor Cx reaches $V_{CM}$, and in this case, the PGA circuit 213 would output a negative going voltage $V_{OUT}$. According to conservation of charge, charges Qx that are released by the detection capacitor Cx to the PGA circuit 213 is equal to $Q_0 - Q_C - V_{CM} \times (C_0 + \Delta Cx)$, and according to $t_2/R_C = -C_0 \times \ln(V_{CM}/U_0)$, $Qx = \Delta Cx \times V_{CM} \times \ln(U_0/V_{CM})$ is obtained.

It can be seen that the charges Qx released by the detection capacitor Cx to the PGA circuit 213 is merely related to the capacitance variation $\Delta Cx$ of the detection capacitor Cx, and is independent of the base capacitance $C_0$ of the detection capacitor Cx. Therefore, the voltage $V_{OUT}$ output by the PGA circuit 213 directly reflects the capacitance variation $\Delta Cx$ of the detection capacitor Cx.

Similarly, if $Ux < V_{CM}$, the PGA circuit 213 would release charges to the detection capacitor Cx though the feedback resistor $R_f$ and the capacitor $C_f$ thereof until the voltage Ux of the detection capacitor Cx reaches $V_{CM}$, and in this case, the PGA circuit 213 would output a positive going voltage $V_{OUT}$. According to conservation of charge, charges Qx that are absorbed by the detection capacitor Cx is equal to $-Q_0 + Q_C + V_{CM} \times (C_0 + \Delta Cx)$, and according to $t_2/R_C = -C_0 \times \ln(V_{CM}/U_0)$, $Qx = -\Delta Cx \times V_{CM} \times \ln(U_0/V_{CM})$ is obtained.

It can be seen that the charges Qx released by the PGA circuit 213 to the detection capacitor Cx is merely related to the capacitance variation $\Delta Cx$ of the detection capacitor Cx, and is independent of the base capacitance $C_0$ of the detection capacitor Cx. Therefore, the voltage $V_{OUT}$ output by the PGA circuit 213 directly reflects the capacitance variation $\Delta Cx$ of the detection capacitor Cx.

Optionally, the PGA circuit 213 may include an operational amplifier and the feedback resistor $R_f$ and the capacitor $C_f$ that are across two ends of the operational amplifier; in addition, optionally, switches are also connected between an input end and an output end of the operational amplifier, such as switches K6 and K7 in FIG. 9; and when K6 and K7 are present, K6 and K7 may be turned on in the first phase t1 and the second phase t2, and turned off in the third phase t3.

In the manner 3, by causing the detection capacitor Cx to discharge to the first cancel resistor $R_C$ for a period of time t2, the function of the first cancel capacitor $C_C$ in the manner 1 is implemented, so that there is no need to use a first cancel capacitor $C_C$ with a great capacitance value, a device cost is reduced, there is also no need of a complicated constant current source circuit, cancellation of a base capacitance of the detection capacitor Cx can be implemented merely by a resistor, and a circuit design is simply.

In this embodiment, the foregoing first phase to the third phase may be regarded as one detection cycle, the capacitance detection circuit 200 can repeatedly perform the operations during the first phase to the third phase N times; in addition, optionally, an average value of capacitance variations ΔCx obtained in the operations for N times can be taken as an actual measurement value of the capacitance variation ΔCx.

In addition, optionally, in FIG. 6, FIG. 8 and FIG. 10, dead zone phases are set between the first phase t1 and the second phase t2, and between the second phase t2 and the third phase t3, that is, time reserved for switching among the first switch K1, the second switch K2 and the third switch K3. For example, a time interval between the first phase t1 and the second phase t2 is a dead zone phase between the first phase t1 and the second phase t2, which could ensure that K2 is turned on after K1 is turned off. Therefore, a problem that the base capacitance cannot be effectively cancelled due to presence of transient overshoot when driving, thereby affecting the sensitivity of capacitance detection can be avoided.

The foregoing described front end circuit 210 includes a cancel circuit and a driving circuit, and the present application is not limited thereto. The front end circuit 210 may further include a plurality of cancel circuits and a plurality of driving circuits, which will be described below by way of example.

Figure 11:
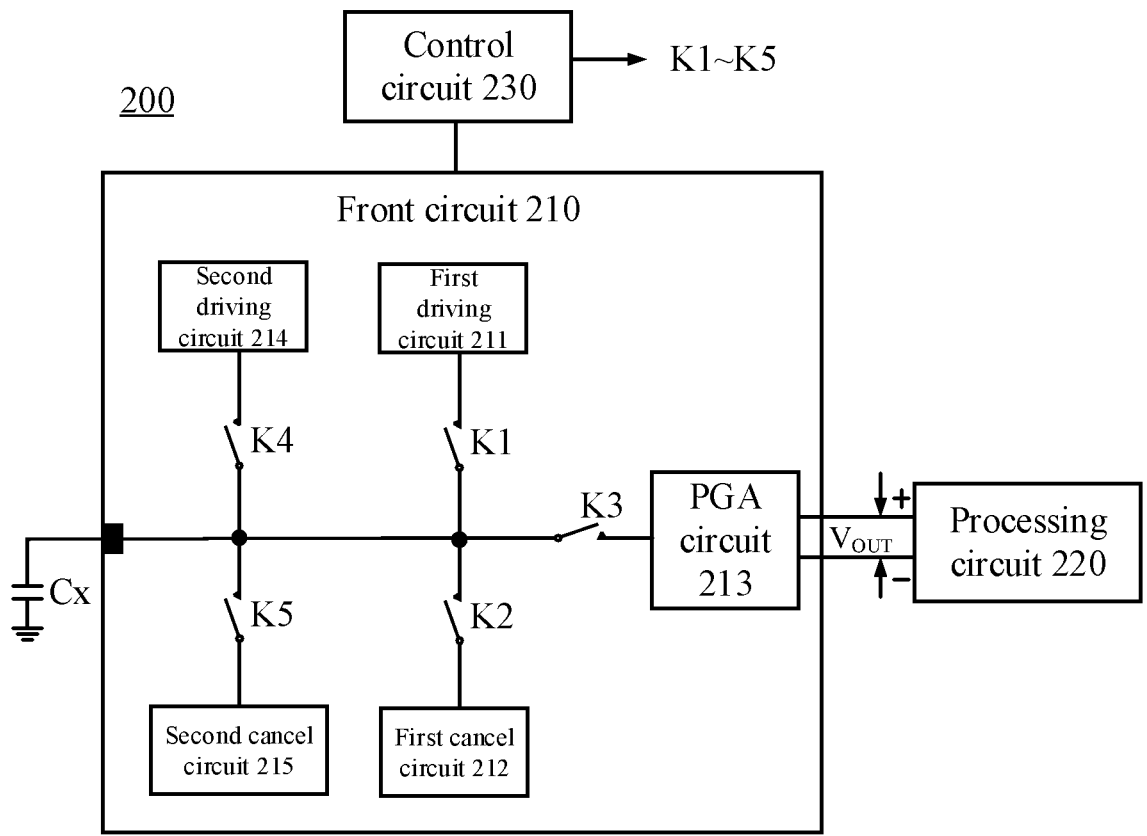
FIG. 11 is another exemplary schematic structural diagram of a capacitance detection circuit according to an embodiment of the present application.

Optionally, for example, as shown in FIG. 11, the front end circuit 210 may further include a second driving circuit 214 and a second cancel circuit 215, and the second driving circuit 214 and the second cancel circuit 215 are connected to a first end of a detection capacitor Cx.

The second driving circuit 214 is configured to perform charging and discharging on the detection capacitor Cx, the second cancel circuit 215 is configured to cancel a base capacitance of the detection capacitor Cx, and a PGA circuit 213 is further configured to convert a capacitance signal of the detection capacitor Cx after the base capacitance is cancelled by the second cancel circuit 215 into a voltage signal.

Optionally, in a fourth phase t4, a control circuit 230 is configured to control the detection capacitor Cx to discharge to the second driving circuit 214; in a fifth phase t5, the control circuit 230 is configured to control the second cancel circuit 215 to charge the detection capacitor Cx, where a quantity of charges transferred in a process that the second cancel circuit 215 charges the detection capacitor Cx is a quantity of charges corresponding to the base capacitance of the detection capacitor Cx; and in a sixth phase t6, the control circuit 230 is configured to control the PGA circuit to convert a capacitance signal of the detection capacitor Cx after the charging into the voltage signal.

Alternatively, optionally, in the fourth phase t4, the control circuit 230 is configured to control the second driving circuit 214 to charge the detection capacitor Cx; in the fifth phase t5, the control circuit 230 is configured to control the detection capacitor Cx to discharge to the second cancel circuit 215, where a quantity of charges transferred in a process that the detection capacitor Cx discharges to the second cancel circuit 215 is the quantity of charges corresponding to the base capacitance of the detection capacitor Cx; and in the sixth phase t6, the PGA circuit converts a capacitance signal of the detection capacitor Cx after the discharging into the voltage signal.

Optionally, a processing circuit 220 is particularly configured to: determine a capacitance variation of a capacitance of the detection capacitor Cx with respect to the base capacitance according to a difference value between the voltage signals output by the front end circuit 210 in a third phase t3 and the sixth phase t6.

In one case, in a first phase t1, a first driving circuit 211 may charge the detection capacitor Cx, and in a second phase t2, the detection capacitor Cx discharges to a first cancel circuit 212, so that in the third phase t3, the PGA circuit 213 outputs a voltage signal $V_{OUT1}$; and in this case, in the fourth phase t4, the detection capacitor Cx needs to discharge to the second driving circuit 214, and in the fifth phase t5, the second cancel circuit 215 needs to charge the detection capacitor Cx, so that in the sixth phase t6, the PGA circuit 213 outputs a voltage signal $V_{OUT2}$, and $V_{OUT2}$ and $V_{OUT1}$ are inverted.

In another case, in the first phase t1, the detection capacitor Cx discharges to the first driving circuit 211, and in the second phase t2, the first cancel circuit 212 charges the detection capacitor Cx, so that in the third phase t3, the PGA circuit 213 outputs a voltage signal $V_{OUT1}$; in this case, in the fourth phase t4, the second driving circuit 214 needs to charge the detection capacitor Cx, and in the fifth phase t5, the detection capacitor Cx needs to discharge to the second cancel circuit 215, so that in the sixth phase t6, the PGA circuit 213 outputs a voltage signal $V_{OUT2}$, and $V_{OUT2}$ and $V_{OUT1}$ are inverted.

In both cases, the processing circuit 220 may determine a capacitance variation ΔCx of the detection capacitor Cx with respect to the base capacitance according to two voltage signals $V_{OUT1}$ and $V_{OUT2}$ respectively output in the third phase t3 and the sixth phase t6, for example, a voltage difference value between $V_{OUT1}$ and $V_{OUT2}$, and this is a correlated double sample CDS process. Noise signals in a capacitance detection circuit are cancelled by collecting voltage signals output during relevant periods and processing the voltage signals collected twice. Specially, the capacitance detection circuit is capable of reducing noise signals existing in a capacitance detection process, such as 1/f noise and low frequency noise.

In the embodiment of the present application, the second cancel circuit 215 may include, for example, a second cancel capacitor, a second cancel resistor or a second current source. The second cancel capacitor, the second cancel resistor or the second current source can be configured to perform cancellation on the base capacitance of the detection capacitor Cx.

Optionally, one end of the second cancel capacitor is connected to the first end of the detection capacitor Cx, and the other end of the second cancel capacitor is grounded; one end of the second cancel resistor is connected to the first end of the detection capacitor Cx, and the other end of the second cancel resistor is grounded; and one end of the second current source is connected to the first end of the detection capacitor Cx, and the other end of the second current source is grounded.

Optionally, the control circuit 230 further includes a fourth switch K4 and a fifth switch K5.

The second driving circuit 214 is connected to the first end of the detection capacitor Cx through the fourth switch K4, and the second cancel circuit 215 is connected to the first end of the detection capacitor Cx through the fifth switch K5.

It should be understood that, in the embodiment of the present application, the control circuit 230 may include a plurality of switches, such as a first switch K1, a second switch K2, and a third switch K3, to control operations of the first driving circuit 211, the first cancel circuit 212 and the PGA circuit 213 in the first phase t1 to the third phase t3; or the control circuit may further include the fourth switch K4 and the fifth switch K5 to control operations of the second driving circuit 214, the second cancel circuit 215 and the PGA circuit 213 in the fourth phase t4 to the sixth phase t6. However, the control circuit 230 of the embodiment of the present application is not limited thereto, and the control circuit may also include much more switches or switches having other connection relationships so as to implement control of driving circuits and cancel circuits. Alternatively, the control circuit 230 may be implemented in other manners, for example, the control circuit 230 includes other devices or structures to control the driving circuits and the cancel circuits. Any control circuit 230 capable of controlling operating states of the first driving circuit 211, the first cancel circuit 212, the second driving circuit 214, the second cancel circuit 215 and the PGA circuit 213 in the present application should fall within the protection scope of the present application.

Optionally, in the fourth phase t4, the fourth switch K4 is turned on, the fifth switch K5 and the third switch K3 are turned off; in the fifth phase t5, the fifth switch K5 is turned on, and the fourth switch K4 and the third switch K3 are turned off; and in the sixth phase t6, the fifth switch K5 and the third switch K3 are turned on, and the fourth switch K4 is turned off, or in the sixth phase t6, the third switch K3 is turned on, and the fourth switch K4 and the fifth switch K5 are turned off.

Further, optionally, when the second cancel circuit 215 includes the second cancel capacitor, the fifth switch K5 and the third switch K3 are turned on in the sixth phase t6, and the fourth switch K4 is turned off in the sixth phase t6, where the PGA circuit 213 converts capacitance signals of the detection capacitor Cx and the second cancel capacitor into a voltage signal in the sixth phase t6; and when the second cancel circuit 215 includes the second cancel resistor or the second current source, the third switch K3 is turned on in the sixth phase t6, and the fourth switch K4 and the fifth switch K5 are turned off in the sixth phase t6, where the PGA circuit 213 converts a capacitance signal of the detection capacitor Cx into a voltage signal in the sixth phase t6.

Figure 12:
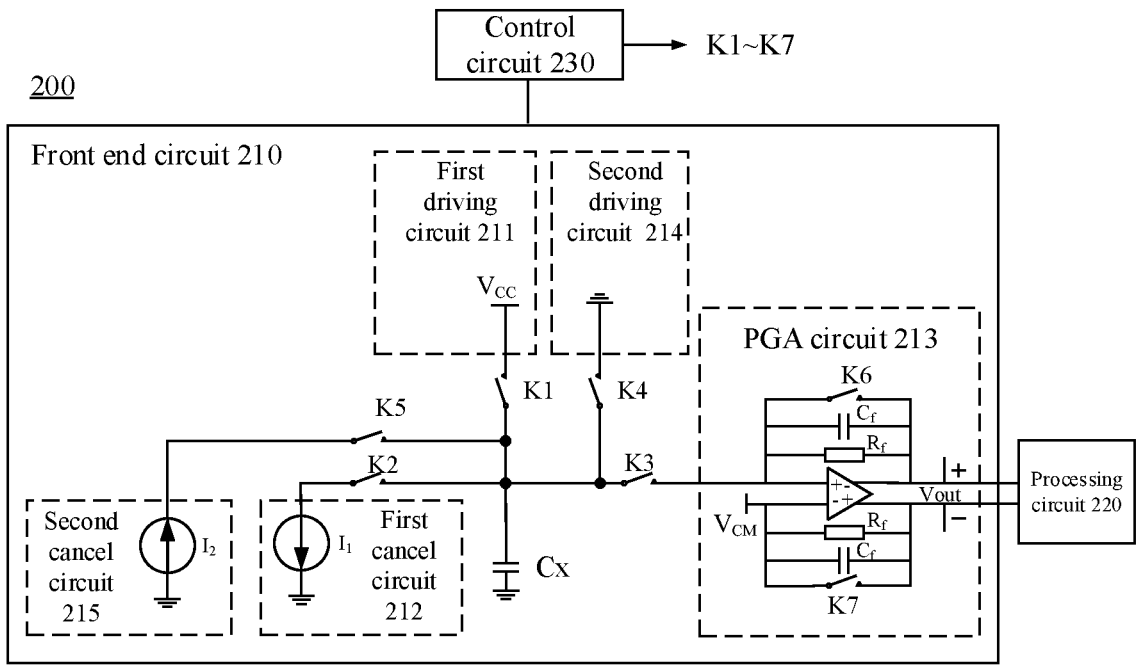
FIG. 12 is another exemplary schematic structural diagram of a capacitance detection circuit according to an embodiment of the present application.

For example, according to a capacitance detection circuit shown in FIG. 12, a first driving circuit 211 is a power supply $V_{CC}$, and the power supply $V_{CC}$ is connected to a first end of a detection capacitor Cx through a first switch K1; a first cancel circuit 212 is a first current source $I_1$, one end of the first current source $I_1$ is ground, and the other end of the first current source $I_1$ is connected to the first end of the detection capacitor Cx through a second switch K2; a second driving circuit 214 is connected to the first end of the detection capacitor Cx through a fourth switch K4, and a second cancel circuit 215 is connected to the first end of the detection capacitor Cx through a fifth switch K5; and one input end of a PGA circuit 213 is connected to the first end of the detection capacitor Cx through a third switch K3, and an input voltage of the other input end of the PGA circuit 213 is equal to a predetermined voltage $V_{CM}$.

Figure 13:
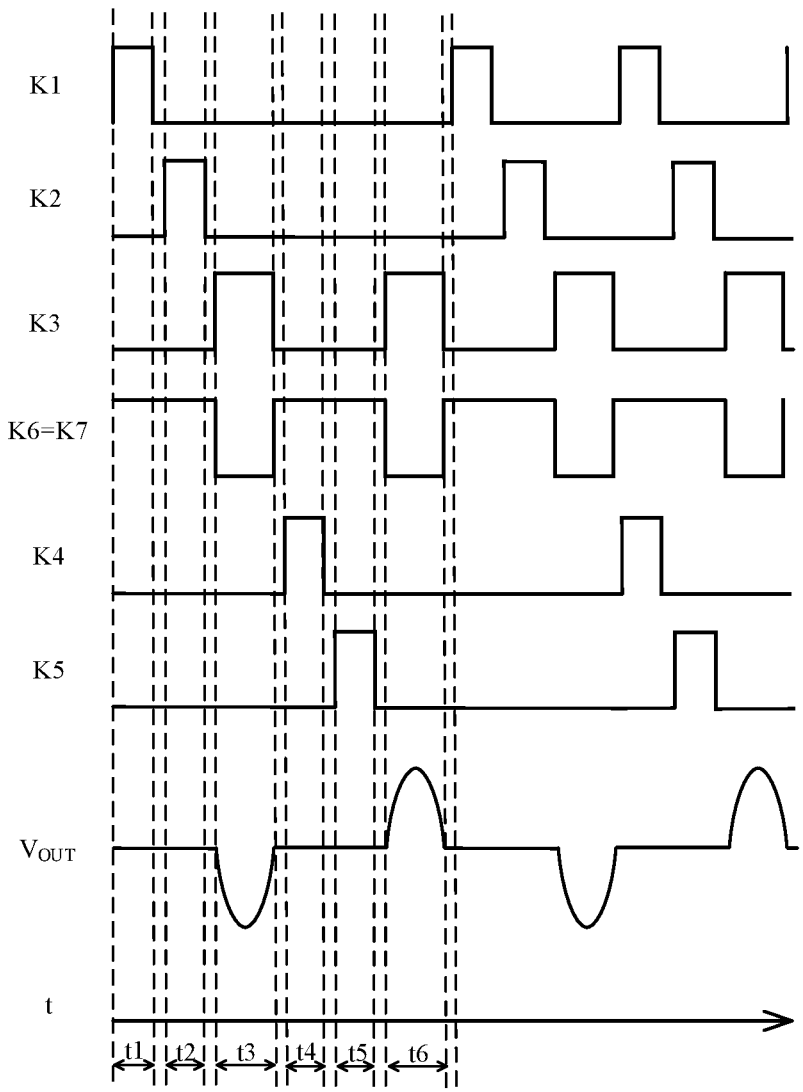
FIG. 13 is another logic timing diagram of a capacitance detection circuit according to an embodiment of the present application.

With reference to a timing diagram shown in FIG. 13, in a first phase t1, the first switch K1 is turned on, and the second switch K2, the third switch K3, the fourth switch K4 and the fifth switch K5 are turned off, so that the first driving circuit 211 charges the detection capacitor Cx to $U_0$ (for example, $U_0=V_{CC}$).

In a second phase t2, the first switch K1, the third switch K3, the fourth switch K4 and the fifth switch K5 are turned off, the second switch K2 is turned on, and charges on the detection capacitor Cx are transferred to the first current source $I_1$.

In a third phase t3, the third switch K3 is turned on, the first switch K1, the second switch K2, the fourth switch K4 and the fifth switch K5 are turned off, and the PGA circuit 213 converts a capacitance signal corresponding to the detection capacitor Cx into a voltage signal and outputs $V_{OUT1}$.

According to the foregoing related description, a magnitude of current of the first current source $I_1$ and duration of t2 are adjusted, so that $I_1 \times t2=(U_0-V_{CM}) \times C_0$. When the finger is touched or approaches (that is, $\Delta Cx \cdot 0$), the PGA circuit 213 outputs a voltage $V_{OUT1}$, and $V_{OUT1}$ is a voltage signal corresponding to a capacitance variation $\Delta Cx$ of the detection capacitor Cx.

In a fourth phase t4, the fourth switch K4 is turned on, and the first switch K1, the second switch K2, the third switch K3 and the fifth switch K5 are turned off, so that the detection capacitor Cx is discharged to the second driving circuit 214 to 0.

In a fifth phase t5, the fifth switch K5 is turned on, and the first switch K1, the second switch K2, the third switch K3 and the fourth switch K4 are turned off, so that the first current source $I_1$ charges the detection capacitor Cx.

In a sixth phase t6, the third switch K3 is turned on, the first switch K1, the second switch K2, the fourth switch K4 and the fifth switch K5 are turned off, the PGA circuit 213 converts a capacitance signal corresponding to the detection capacitor Cx into a voltage signal and outputs $V_{OUT2}$, and $V_{OUT2}$ is a voltage signal corresponding to the capacitance variation $\Delta Cx$ of the detection capacitor Cx.

Similarly, a magnitude of current of a second current source $I_2$ and duration of t5 are adjusted, so that $I_2 \times t5=(U_0-V_{CM}) \times C_0$. When the finger is touched or approaches (that is, $\Delta Cx \neq 0$), the PGA circuit 213 outputs a voltage $V_{OUT2}$, $V_{OUT2}$ is a voltage signal corresponding to the capacitance variation $\Delta Cx$ of the detection capacitor CX, and $V_{OUT2}$ and $V_{OUT1}$ are inverted.

According to $V_{OUT1}$ output in the third phase t3 and $V_{OUT2}$ output in the sixth phase t6, a processing circuit 220 obtains a voltage signal V, where $V_{OUT1}$ is equal to $Vx+\Delta V$, $V_{OUT2}$ is equal to $-Vx+\Delta V$, so that V is equal to $V_{OUT1}-V_{OUT2}$ or 2Vx. Since the foregoing respective phases in a same detection cycle are correlated, noise carried in $V_{OUT1}$ output by the PGA circuit 213 in the third phase t3 and noise carried in $V_{OUT2}$ output in the sixth phase t6 can be substantially regarded to be the same, and both are $\Delta V$ herein. Therefore, a noise signal $\Delta V$ can be cancelled after subtracting $V_{OUT1}$ output in the third phase t3 from $V_{OUT2}$ output in the sixth phase t6 by a front end circuit 210, where $V_{OUT1}$ is equal to $Vx+\Delta V$, and $V_{OUT2}$ is equal to $(-Vx)+\Delta V$, so that a signal-to-noise ratio of a voltage signal output by the capacitance detection circuit is increased.

In addition, in the embodiment of the present application, by setting a cancel circuit in a front end circuit, a processing circuit processes a voltage signal output by the front end circuit more conveniently and flexibly, for example, correlated double sampling can be implement by performing differencing on results of capacitance detection for two times, thereby reducing a noise signal and improving touch control sensitivity. Especially in a case of a greater self-capacitance, when a capacitance variation caused when a conductor approaches or touches a detection electrode is relatively less, the capacitance variation can still be obtained more accurately, thereby improving touch control sensitivity, and a more accurate measurement result could be obtained.

It should be understood that specific derivation of a change in a quantity of charges and a change in voltage in each of the foregoing phases may be referred to the foregoing relevant description of the Manner 1 to the Manner 3, which will not repeatedly described here for brevity.

Optionally, a dead zone phase is set between any two adjacent phases of the first phase t1 to the sixth phase t6, that is, time reserved for switching among the first switch K1 to the fifth switch K5. For example, a time interval between the first phase t1 and the second phase t2 is a dead zone phase between the first phase t1 and the second phase t2, which could ensure that K2 is turned on after K1 is turned off. Therefore, a problem that the base capacitance cannot be effectively cancelled due to presence of transient overshoot when driving, thereby affecting the sensitivity of capacitance detection can be avoided.

Optionally, in the embodiment of the present application, the PGA circuit 213 may include an operational amplifier and a feedback resistor $R_f$ and a capacitor $C_f$ that are across two ends of the operational amplifier; in addition, optionally, switches are also connected between an input end and an output end of the operational amplifier, such as switches K6 and K7 in FIG. 12; and when K6 and K7 are present, K6 and K7 are turned on in the first phase t1, the second phase t2, the fourth phase t4 and the fifth phase t5, and turned off in the third phase t3 and the sixth phase t6.

In this embodiment, the capacitance detection circuit is constructed actually on the basis of the front end circuit in the foregoing three cases combined with the principle of correlated double sampling, for example, according to the capacitance detection circuit shown in FIG. 11, two current sources are used as the first cancel circuit and the second cancel circuit, respectively. Of course, two resistors, two capacitors, or a combination of a capacitor, a resistor, and a current source may also be used as the first cancel circuit and the second cancel circuit, respectively. Operation manners of two cancel circuits are reversed, thereby implementing suppression of noise signals such as 1/f noise, and improving a signal-to-noise ratio of the capacitance detection circuit. For brevity, details are not described herein.

In this embodiment, the foregoing first phase to the sixth phase may be regarded as one detection cycle, the capacitance detection circuit 200 can repeatedly perform the operations during the first phase to the sixth phase N times. In addition, optionally, an average value of capacitance variations $\Delta Cx$ obtained in the operations for N times may be taken as an actual measurement value of the capacitance variation $\Delta Cx$.

In addition, in this embodiment, the operations during the first phase t1 to the third phase t3 may be regarded as a set of operations, and the set of operations is for performing detection on the capacitance of the detection capacitor Cx through the first cancel circuit 212, the first driving circuit 211 and the PGA circuit 213 once, where the second phase t2 is after the first phase t1, and the third phase t3 is after the second phase t2.

The operations during the fourth phase t4 to the sixth phase t6 may be regarded as another set of operations, the another set of operations is for performing detection on the capacitance of the detection capacitor Cx through the second cancel circuit 215, the second driving circuit 214 and the PGA circuit 213 for another time, where the fifth phase t5 is after the fourth phase t4, and the sixth phase t6 is after the fifth phase t5.

However, an order of the two sets of operations is not limited in the embodiment of the present application. That is, for example, as shown in FIG. 13, the fourth phase t4 may be after the third phase t3; or the first phase t1 may be after the sixth phase t6.

Figures 14, 15:
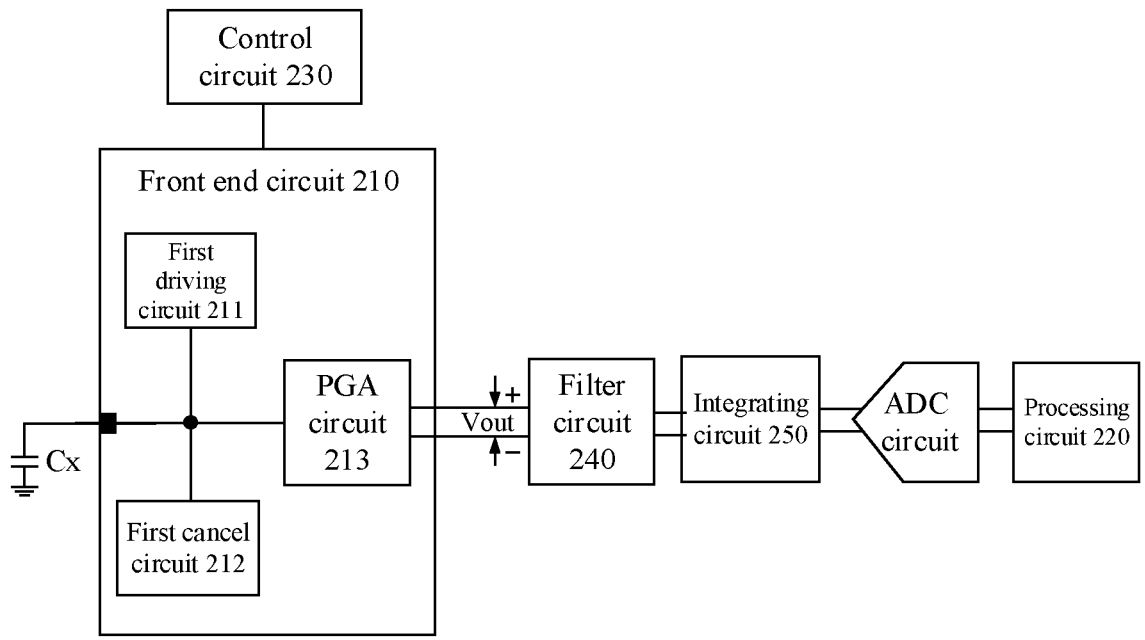
FIG. 14 is another exemplary schematic structural diagram of a capacitance detection circuit according to an embodiment of the present application.
FIG. 15 is a schematic circuit diagram of a touch detection device according to an embodiment of the present application.

Optionally, as shown in FIG. 14, the front end circuit 210 may further include a filter circuit 240 and/or an integrating circuit 250, where the filter circuit 240 is configured to filter an interference signal in a voltage signal output by the front end circuit 210, and the integrating circuit 250 is configured to perform integration and amplification processing on the voltage signal output by the front end circuit 210.

It should be understood that, in practical applications, since there may be a certain error in a voltage parameter, a capacitance parameter or the like related to a driving circuit, a cancel circuit, a detection capacitor or the like, it is possible that the cancel circuit may not completely cancel a basic capacitance of a detection capacitor, that is, a contribution of the base capacitance to an output voltage of an amplifier may not be zero absolutely. Therefore, herein, that the cancel circuit cancels the base capacitance may refer to that the cancel circuit completely cancels the base capacitance or approximately cancels the base capacitance (for example, a capacitance amount of the base capacitance that is cancelled reaches a certain threshold).

It should be noted that, under a premise of no conflict, various embodiments and/or technical features in the various embodiments described in the present application may be combined with each other arbitrarily, and the technical solutions obtained after the combination should also fall within the protection scope of the present application.

FIG. 15 is a schematic circuit diagram of a touch detection device 1500 according to an embodiment of the present application.

As shown in FIG. 15, the touch detection device 1500 includes the capacitance detection circuit 200 shown in any one of FIG. 2 to FIG. 4, where the touch detection device 1500 determines a touch position of a user according to a capacitance variation of a detection capacitor with respect to a base capacitance that is determined by the capacitance detection circuit 200.

Therefore, an embodiment of the present application provides a capacitance detection circuit; by performing cancellation on a base capacitance of a detection capacitor before a capacitance signal is converted into a voltage signal, a collected voltage signal can directly reflect a variation of a capacitance of the detection capacitor with respect to the base capacitance, thereby implementing the cancellation of the base capacitance in a capacitance detection process, and improving sensitivity of capacitance detection to obtain a more accurate measurement result.

Optionally, an embodiment of the present application provides a terminal device, including the touch detection device 1500 shown in FIG. 15.

Therefore, according to a terminal device in an embodiment of the present application, a touch position of a user on a touch detection device can be determined more accurately, an influence of a base capacitance on touch control sensitivity is overcome, the touch control sensitivity of the terminal device is improved, and then an existing base capacitance detection device can be optimized.

Those of ordinary skill in the art may be aware that, units and circuits of the examples described in the embodiments disclosed in this description may be implemented by electronic hardware, computer software, or a combination of the two. Whether these functions are executed in hardware or software mode depends on the specific applications and design constraint conditions of the technical solution. Those skilled may implement the described functions by using different methods for each specific application, but this implementation should not be considered to be beyond the scope of the present application.

In the several embodiments provided in the present application, it should be understood that, the disclosed circuits, branches and units may be realized in other manners. For example, the branches described above are merely exemplary, for example, the division of the units is merely a logic function division, other division manners may exist in practical implementation, for example, a plurality of units or components may be combined or integrated to another branch, or some features may be omitted or not implemented.

If the integrated unit is implemented in the form of the software functional unit and is sold or used as an independent product, it may be stored in a computer readable storage medium. Based on such understanding, the technical solutions of the present application substantially, or the part of the present disclosure making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes: various media capable of storing program codes, such as a U disk, a mobile hard disk, a read-only memory ROM, a random access memory RAM, a disk, an optical disk or the like.

Described above are the specific implementation manners of the present application only, but the protection scope of the embodiments of present application is not limited thereto, those skilled who are familiar with the art could readily think of variations or substitutions within the technical scope disclosed by the embodiments of the present application, and these variations or substitutions shall fall within the protection scope suitable for personal interests of the present application. Therefore, the protection scope of the present application should be determined with reference to the protection scope of the claims.

What is claimed is:

1. A capacitance detection circuit, configured to detect a capacitance of a detection capacitor, wherein the capacitance detection circuit comprises a front end circuit and a processing circuit;
    wherein the front end circuit comprises a first driving circuit, a first cancel circuit and a programmable gain amplification (PGA) circuit, the first driving circuit, the first cancel circuit and the PGA circuit are connected to a first end of the detection capacitor, a second end of the detection capacitor is grounded, the first driving circuit is configured to charge and discharge the detection capacitor, the first cancel circuit is configured to cancel a base capacitance of the detection capacitor, and the PGA circuit is configured to convert a capacitance signal of the detection capacitor, after the base capacitance is canceled, to a voltage signal; and
    the processing circuit is connected to an output end of the front end circuit, and is configured to determine a capacitance variation of the capacitance of the detection capacitor with respect to the base capacitance according to a voltage signal output from the front end circuit.

2. The capacitance detection circuit according to claim 1, wherein the first cancel circuit comprises a first cancel capacitor, a first cancel resistor or a first current source.

3. The capacitance detection circuit according to claim 2, wherein the front end circuit further comprises a filter circuit and/or an integrating circuit, wherein the filter circuit is configured to filter an interference signal in the voltage signal output by the front end circuit, and the integrating circuit is configured to perform integration and amplification processing on the voltage signal output by the front end circuit.

4. The capacitance detection circuit according to claim 1, wherein the capacitance detection circuit further comprises a control circuit, and
    in a first phase, the control circuit is configured to control the first driving circuit to charge the detection capacitor;
    in a second phase, the control circuit is configured to control the detection capacitor to discharge to the first cancel circuit, wherein a quantity of charges transferred in a process that the detection capacitor discharges to the first cancel circuit is a quantity of charges corresponding to the base capacitance of the detection capacitor; and
    in a third phase, the control circuit is configured to control the PGA circuit to convert a capacitance signal of the detection capacitor after the discharging into the voltage signal.

5. The capacitance detection circuit according to claim 4, wherein the control circuit comprises a first switch, a second switch, and a third switch,
    the first driving circuit is connected to the first end of the detection capacitor through the first switch, the first cancel circuit is connected to the first end of the detection capacitor through the second switch, one input end of the PGA circuit is connected to the first end of the detection capacitor through the third switch, and an input voltage of the other input end of the PGA circuit is a predetermined voltage.

6. The capacitance detection circuit according to claim 4, wherein
    in the first phase, the first switch is turned on, and the second switch and the third switch are turned off;
    in the second phase, the second switch is turned on, and the first switch and the third switch are turned off; and
    in the third phase, the third switch is turned on, and the first switch and the second switch are turned off; or in the third phase, the second switch and the third switch are turned on, and the first switch is turned off;
    wherein when the first cancel circuit comprises a first cancel capacitor, the second switch and the third switch are turned on in the third phase, and the first switch is turned off in the third phase, wherein the PGA circuit converts capacitance signals of the detection capacitor and the first cancel capacitor into the voltage signal in the third phase; and
    when the first cancel circuit comprises a first cancel resistor or a first current source, the third switch is turned on in the third phase, and the first switch and the second switch is turned off in the third phase.

7. The capacitance detection circuit according to claim 1, wherein the capacitance detection circuit further comprises a control circuit, and
    in a first phase, the control circuit is configured to control the detection capacitor to discharge to the first driving circuit;

in a second phase, the control circuit is configured to control the first cancel circuit to charge the detection capacitor, wherein a quantity of charges transferred in a process that the first cancel circuit charges the detection capacitor is a quantity of charges corresponding to the base capacitance of the detection capacitor; and in a third phase, the control circuit is configured to control the PGA circuit to convert a capacitance signal of the detection capacitor after the charging into the voltage signal.

8. The capacitance detection circuit according to claim 7, wherein the control circuit comprises a first switch, a second switch, and a third switch, the first driving circuit is connected to the first end of the detection capacitor through the first switch, the first cancel circuit is connected to the first end of the detection capacitor through the second switch, one input end of the PGA circuit is connected to the first end of the detection capacitor through the third switch, and an input voltage of the other input end of the PGA circuit is a predetermined voltage.

9. The capacitance detection circuit according to claim 7, wherein in the first phase, the first switch is turned on, and the second switch and the third switch are turned off;

in the second phase, the second switch is turned on, and the first switch and the third switch are turned off; and in the third phase, the third switch is turned on, and the first switch and the second switch are turned off; or in the third phase, the second switch and the third switch are turned on, and the first switch is turned off;

wherein when the first cancel circuit comprises a first cancel capacitor, the second switch and the third switch are turned on in the third phase, and the first switch is turned off in the third phase, wherein the PGA circuit converts capacitance signals of the detection capacitor and the first cancel capacitor into the voltage signal in the third phase; and when the first cancel circuit comprises a first cancel resistor or a first current source, the third switch is turned on in the third phase, and the first switch and the second switch is turned off in the third phase.

10. The capacitance detection circuit according to claim 1, wherein the front end circuit further comprises a second driving circuit and a second cancel circuit, and the second driving circuit and the second cancel circuit are connected to the first end of the detection capacitor, wherein the second driving circuit is configured to perform charging and discharging on the detection capacitor, the second cancel circuit is configured to cancel the base capacitance of the detection capacitor, and the PGA circuit is configured to convert a capacitance signal of the detection capacitor after the base capacitance is cancelled into a voltage signal.

11. The capacitance detection circuit according to claim 10, wherein the second cancel circuit comprises a second cancel capacitor, a second cancel resistor or a second current source.

12. The capacitance detection circuit according to claim 10, wherein in a fourth phase, a control circuit is configured to control the detection capacitor to discharge to the second driving circuit;

in a fifth phase, the control circuit is configured to control the second cancel circuit to charge the detection capacitor, wherein a quantity of charges transferred in a process that the second cancel circuit charges the detection capacitor is a quantity of charges corresponding to the base capacitance of the detection capacitor; and in a sixth phase, the control circuit is configured to control the PGA circuit to convert a capacitance signal of the detection capacitor after the charging into the voltage signal.

13. The capacitance detection circuit according to claim 12, wherein the control circuit further comprises a fourth switch and a fifth switch, the second driving circuit is connected to the first end of the detection capacitor through the fourth switch, and the second cancel circuit is connected to the first end of the detection capacitor through the fifth switch;

in the fourth phase, the fourth switch is turned on, and the fifth switch and the third switch are turned off;

in the fifth phase, the fifth switch is turned on, and the fourth switch and the third switch are turned off; and in the sixth phase, the third switch is turned on, and the fifth switch and the fourth switch are turned off; or in the sixth phase, the fifth switch and the third switch is turned on, and the fourth switch is turned off;

wherein when the second cancel circuit comprises a second cancel capacitor, the fifth switch and the third switch are turned on in the sixth phase, and the fourth switch is turned off in the sixth phase, wherein the PGA circuit converts a capacitance signal of the detection capacitor and the second cancel capacitor into the voltage signal in the sixth phase; and when the second cancel circuit comprises a second cancel resistor or a second current source, the third switch is turned on in the sixth phase, and the fourth switch and the fifth switch is turned off in the sixth phase.

14. The capacitance detection circuit according to claim 12, wherein the processing circuit is configured to:

determine a capacitance variation of the capacitance of the detection capacitor with respect to the base capacitance according to a difference value between the voltage signals output by the front end circuit in the third phase and the sixth phase.

15. The capacitance detection circuit according to claim 10, wherein in a fourth phase, a control circuit is configured to control the second driving circuit to charge the detection capacitor;

in a fifth phase, the control circuit is configured to control the detection capacitor to discharge to the second cancel circuit, wherein a quantity of charges transferred in a process that the detection capacitor discharges to the second cancel circuit is a quantity of charges corresponding to the base capacitance of the detection capacitor; and in a sixth phase, the control circuit is configured to control the PGA circuit to convert a capacitance signal of the detection capacitor after the discharging into the voltage signal.

16. The capacitance detection circuit according to claim 15, wherein the control circuit further comprises a fourth switch and a fifth switch, the second driving circuit is connected to the first end of the detection capacitor through the fourth switch, and the second cancel circuit is connected to the first end of the detection capacitor through the fifth switch;

in the fourth phase, the fourth switch is turned on, and the fifth switch and the third switch are turned off;

in the fifth phase, the fifth switch is turned on, and the fourth switch and the third switch are turned off; and in the sixth phase, the third switch is turned on, and the fifth switch and the fourth switch are turned off; or in the sixth phase, the fifth switch and the third switch is turned on, and the fourth switch is turned off;

wherein when the second cancel circuit comprises a second cancel capacitor, the fifth switch and the third switch are turned on in the sixth phase, and the fourth switch is turned off in the sixth phase, wherein the PGA circuit converts a capacitance signal of the detection capacitor and the second cancel capacitor into the voltage signal in the sixth phase; and when the second cancel circuit comprises a second cancel resistor or a second current source, the third switch is turned on in the sixth phase, and the fourth switch and the fifth switch is turned off in the sixth phase.

17. The capacitance detection circuit according to claim 15, wherein the processing circuit is configured to:

determine a capacitance variation of the capacitance of the detection capacitor with respect to the base capacitance according to a difference value between the voltage signals output by the front end circuit in the third phase and the sixth phase.

18. The capacitance detection circuit according to claim 1, wherein the front end circuit further comprises a filter circuit and/or an integrating circuit, wherein the filter circuit is configured to filter an interference signal in the voltage signal output by the front end circuit, and the integrating circuit is configured to perform integration and amplification processing on the voltage signal output by the front end circuit.

19. A touch detection device, comprising:

a capacitance detection circuit, configured to detect a capacitance of a detection capacitor, wherein the capacitance detection circuit comprises a front end circuit and a processing circuit;

wherein the front end circuit comprises a first driving circuit, a first cancel circuit and a programmable gain amplification (PGA) circuit, the first driving circuit, the first cancel circuit and the PGA circuit are connected to a first end of the detection capacitor, a second end of the detection capacitor is grounded, the first driving circuit is configured to charge and discharge the detection capacitor, the first cancel circuit is configured to cancel a base capacitance of the detection capacitor, and the PGA circuit is configured to convert a capacitance signal of the detection capacitor, after the base capacitance is canceled, to a voltage signal; and the processing circuit is connected to an output end of the front end circuit, and is configured to determine a capacitance variation of the capacitance of the detection capacitor with respect to the base capacitance according to a voltage signal output from the front end circuit;

wherein the touch detection device determines a touch position of a user according to a capacitance variation of the detection capacitor with respect to a base capacitance that is determined by the capacitance detection circuit.

20. A terminal device, comprising:

a capacitance detection circuit, configured to detect a capacitance of a detection capacitor, wherein the capacitance detection circuit comprises a front end circuit and a processing circuit;

wherein the front end circuit comprises a first driving circuit, a first cancel circuit and a programmable gain amplification (PGA) circuit, the first driving circuit, the first cancel circuit and the PGA circuit are connected to a first end of the detection capacitor, a second end of the detection capacitor is grounded, the first driving circuit is configured to charge and discharge the detection capacitor, the first cancel circuit is configured to cancel a base capacitance of the detection capacitor, and the PGA circuit is configured to convert a capacitance signal of the detection capacitor, after the base capacitance is canceled, to a voltage signal; and the processing circuit is connected to an output end of the front end circuit, and is configured to determine a capacitance variation of the capacitance of the detection capacitor with respect to the base capacitance according to a voltage signal output from the front end circuit;

wherein the touch detection device determines a touch position of a user according to a capacitance variation of the detection capacitor with respect to a base capacitance that is determined by the capacitance detection circuit.

* * * * *